(12) United States Patent
Javed et al.

(10) Patent No.: US 10,129,110 B2
(45) Date of Patent: Nov. 13, 2018

(54) APPARATUS AND METHOD OF IDENTIFYING A USER PLANE IDENTIFIER OF A USER DEVICE BY A MONITORING PROBE

(71) Applicant: CELLOS SOFTWARE LTD, Melbourne (AU)

(72) Inventors: Adnan Javed, Fawkner (AU); Amit Goel, Gurgaon Haryana (IN)

(73) Assignee: Cellos Software LTD, Irvine, CA (US)

( * ) Notice: Subject to any disclaimer, the term of this patent is extended or adjusted under 35 U.S.C. 154(b) by 167 days.

(21) Appl. No.: 14/789,130

(22) Filed: Jul. 1, 2015

(65) Prior Publication Data

US 2016/0006625 A1    Jan. 7, 2016

Related U.S. Application Data

(60) Provisional application No. 62/019,514, filed on Jul. 1, 2014.

(51) Int. Cl.
*H04L 12/26*    (2006.01)

(52) U.S. Cl.
CPC ............ *H04L 43/026* (2013.01); *H04L 43/12* (2013.01)

(58) Field of Classification Search
USPC ......................................................... 370/253
See application file for complete search history.

(56) References Cited

U.S. PATENT DOCUMENTS

| | | | |
|---|---|---|---|
| 2013/0170350 A1* | 7/2013 | Sarkar | H04W 28/24 370/235 |
| 2013/0272127 A1* | 10/2013 | Ali | H04W 76/022 370/235 |
| 2013/0272131 A1* | 10/2013 | Takano | H04W 88/16 370/235 |
| 2013/0272136 A1 | 10/2013 | Ali et al. | |
| 2014/0241158 A1* | 8/2014 | Anthony, Jr. | H04W 28/0231 370/235 |
| 2015/0043353 A1 | 2/2015 | Javed | |
| 2015/0201394 A1* | 7/2015 | Qu | H04W 4/029 455/456.1 |
| 2015/0215841 A1* | 7/2015 | Hsu | H04L 43/12 370/328 |
| 2015/0282082 A1* | 10/2015 | Landais | H04W 52/0222 370/311 |

OTHER PUBLICATIONS

3GPP TS 29.274 v12.5.0 (Jun. 2014), Tunnelling Protocol for Control plance (GTPv2-c).*

* cited by examiner

*Primary Examiner* — Gregory B Sefcheck
*Assistant Examiner* — Majid Esmaeilian
(74) *Attorney, Agent, or Firm* — Shumaker, Loop & Kendrick, LLP

(57) ABSTRACT

The present disclosure relates to methods of tracking user specific tunnels in wireless communication networks, such as a UTRAN/GERAN connected to a LTE network.

18 Claims, 11 Drawing Sheets

APPARATUS AND METHOD OF IDENTIFYING A USER PLANE IDENTIFIER OF A USER DEVICE BY A MONITORING PROBE

CROSS-REFERENCE TO RELATED APPLICATIONS

This Application claims priority to U.S. Provisional Application No. 62/019,514 filed Jul. 1, 2014 and titled APPARATUS AND METHOD OF IDENTIFYING AND UPDATING USER SPECIFIC SESSIONS IN WIRELESS COMMUNICATION NETWORK, the disclosure of which is incorporated herein by reference in its entirety.

FIELD

The present disclosure relates to methods of tracking user specific tunnels in wireless communication networks, such as a UTRAN/GERAN connected to a LTE network.

BACKGROUND

Network monitoring devices, such as monitoring probes, have been proposed to measure performance of traffic flows in Long Term Evolution (LTE) networks. Due to the large amount of data packets in traffic flows and the high speeds of traffic flows, it is difficult for conventional network monitoring devices to identify user specific tunnels. Another difficulty is that users may move around in LTE networks and it may be difficult to track user specific tunnels after users move from coverage of one base station (NodeB) to another since some fields or parameters in control plane signalling/message sent by NodeBs may be the same.

There is therefore a need for solutions to enable network monitoring systems to track user specific tunnels in Universal Mobile Telecommunications System Terrestrial Radio Access Network/GSM EDGE Radio Access Network (UTRAN/GERAN) connected to a LTE network.

SUMMARY

According to the present disclosure, there is provided a method of identifying a user plane identifier of a user device by a monitoring probe in communication with at least one network device, the method including:
  monitoring a Serving Gateway over an S4 interface for receipt of a Create Session Request message comprising a first control plane Serving GPRS Support Node fully qualified Tunnel end identifier and an International mobile subscriber identity or a Globally Unique Temporary Identifier, and a first user plane identifier;
  in response to receipt of the Create Session Request message, monitoring the Serving Gateway over the S4 interface for receipt of a Create Session Response message comprising a second control plane Serving GPRS Support Node fully qualified Tunnel end identifier and a second user plane identifier;
  in response to receipt of the Create Session Response message, comparing the first control plane Serving GPRS Support Node fully qualified Tunnel end identifier to the second control plane Serving GPRS Support Node fully qualified Tunnel end identifier in order to determine whether or not the first control plane Serving GPRS Support Node fully qualified Tunnel end identifier corresponds to the second control plane Serving GPRS Support Node fully qualified Tunnel end identifier;
  in response to a determination that the first control plane Serving GPRS Support Node fully qualified Tunnel end identifier corresponds to the second control plane Serving GPRS Support Node fully qualified Tunnel end identifier, outputting the first control plane Serving GPRS Support Node fully qualified Tunnel end identifier, the first user plane identifier and the second user plane identifier to a same memory allocation such that the first user plane identifier and the second user plane identifier are identified as the user plane identifiers of a user device;
  monitoring the Serving Gateway for one or more user plane packets exchanged over the S4 interface or a S12 interface connecting the Serving Gateway with a Radio Network Controller which is further connected to at least one base station in a wireless communication network; and
  in response to a determination that the one or more user plane data packets from the S4 or the S12 interface include one of the user plane identifiers of the user device, identifying the one or more user plane data packets as belonging to a given session directly associated with one of the output user plane identifiers.

The method may further comprise:
obtaining the International mobile subscriber identity or the Globally Unique Temporary Identifier, a first control plane Serving Gateway fully qualified Tunnel end identifier and a first evolved packet system bearer identity associated with a default bearer for the user device from the Create Session Request message; and
associating the first evolved packet system bearer identity, the first control plane Serving GPRS Support Node fully qualified Tunnel end identifier, the first control plane Serving Gateway fully qualified Tunnel end identifier and the first user plane identifier with the International mobile subscriber identity or the Globally Unique Temporary Identifier by outputting the first evolved packet system bearer identity, the first control plane Serving GPRS Support Node fully qualified Tunnel end identifier, the first control plane Serving Gateway fully qualified Tunnel end identifier, the first user plane identifier and the International mobile subscriber identity or the Globally Unique Temporary Identifier to the same memory allocation.

The first user plane identifier may be a user plane Serving GPRS Support Node fully qualified Tunnel end identifier.

The second user plane identifier may be a user plane Serving Gateway fully qualified Tunnel end identifier or a user plane Radio Network Controller fully qualified Tunnel end identifier.

Each fully qualified Tunnel end identifier may comprise a tunnel end identifier of a network device and an Internet Protocol address.

Each of the user plane identifiers of the user device may be arranged to identify one or more user plane data packets transmitted from the Serving GPRS Support Node to the Serving Gateway, or vice versa.

Each of the user plane identifiers of the user device may be arranged to identify one or more user plane data packets transmitted from the Radio Network Controller to the Serving Gateway, or vice versa.

The step of determining that the first control plane Serving GPRS Support Node fully qualified Tunnel end identifier corresponds to the second control plane Serving GPRS Support Node fully qualified Tunnel end identifier may further comprise:
- in response to a determination that the first and second control plane messages are Create Session Request message and Create Session Response message respectively, determining whether a first GPRS Tunnelling Protocol header sequence number received from the Create Session Request message corresponds to a second GPRS Tunnelling Protocol header sequence number received from the Create Session Response message; and
- in response to the determination that the first GPRS Tunnelling Protocol header sequence number corresponds to the second GTP header sequence number, outputting a determination that the first control plane Serving GPRS Support Node fully qualified Tunnel end identifier corresponds to the second control plane Serving GPRS Support Node fully qualified Tunnel end identifier.

The method may further comprise:
- monitoring the Serving Gateway over the S4 interface for receipt of a Modify Bearer Request message comprising a third control plane Serving GPRS Support Node fully qualified Tunnel end identifier and a third user plane identifier of the network device;
- in response to receipt of the Modify Bearer Request message, comparing the third control plane Serving GPRS Support Node fully qualified Tunnel end identifier to the first control plane Serving GPRS Support Node fully qualified Tunnel end identifier in order to determine whether or not the third control plane Serving GPRS Support Node fully qualified Tunnel end identifier corresponds to the first control plane Serving GPRS Support Node fully qualified Tunnel end identifier; and
- in response to the determination that the third control plane Serving GPRS Support Node fully qualified Tunnel end identifier corresponds to the first control plane Serving GPRS Support Node fully qualified Tunnel end identifier, outputting the third user plane identifier of the network device as an updated user plane fully qualified Tunnel end identifier of the Serving GPRS Support Node or the Radio Network Controller.

The method may further comprise:
- in response to receipt of the Modify Bearer Request message, monitoring the Serving Gateway over the S4 interface for receipt of a Modify Bearer Response message comprising a fourth control plane Serving GPRS Support Node fully qualified Tunnel end identifier and a fourth user plane identifier of the Serving Gateway;
- in response to receipt of the Modify Bearer Response message, comparing the fourth control plane Serving GPRS Support Node fully qualified Tunnel end identifier to the third control plane Serving GPRS Support Node fully qualified Tunnel end identifier in order to determine whether or not the fourth control plane Serving GPRS Support Node fully qualified Tunnel end identifier corresponds to the third control plane Serving GPRS Support Node fully qualified Tunnel end identifier;
- in response to a determination that the fourth control plane Serving GPRS Support Node fully qualified Tunnel end identifier corresponds to the third control plane Serving GPRS Support Node fully qualified Tunnel end identifier, comparing a third GPRS Tunnelling Protocol sequence number received from the Modify Bearer Request message to a fourth GPRS Tunnelling Protocol sequence number received from the Modify Bearer Response message, in order to determine whether or not the third GPRS Tunnelling Protocol sequence number corresponds to the fourth GPRS Tunnelling Protocol sequence number; and
- in response to a determination that the third GPRS Tunnelling Protocol sequence number corresponds to the fourth GPRS Tunnelling Protocol sequence number, determining the fourth control plane Serving GPRS Support Node fully qualified Tunnel end identifier corresponds to the third control plane Serving GPRS Support Node fully qualified Tunnel end identifier, and outputting the fourth user plane identifier of the Serving Gateway as an updated user plane Serving GPRS Support Node fully qualified Tunnel end identifier of the Serving Gateway.

The method may further comprise:
- monitoring the Serving Gateway over the S4 interface for receipt of a Delete Session Request Message comprising the second control plane Serving GPRS Support Node fully qualified Tunnel end identifier and a fifth GPRS Tunnelling Protocol header sequence number;
- in response to receipt of the Delete Session Request Message, comparing the second control plane Serving GPRS Support Node fully qualified Tunnel end identifier to the first control plane Serving GPRS Support Node fully qualified Tunnel end identifier received from the Create Session Request message in order to determine whether or not the Delete Session Request Message corresponds to the Create Session Request message; and
- in response to a determination that the Delete Session Request Message corresponds to the Create Session Request message, obtaining the fifth GPRS Tunnelling Protocol header sequence number from the Delete Session Request Message;
- monitoring the Serving Gateway over the S4 interface for receipt of a Delete Session Response Message comprising a fifth control plane Serving GPRS Support Node fully qualified Tunnel end identifier and a sixth GPRS Tunnelling Protocol header sequence number; and
- in response to receipt of the Delete Session Response Message, comparing the fifth control plane Serving GPRS Support Node fully qualified Tunnel end identifier to the first control plane Serving GPRS Support Node fully qualified Tunnel end identifier previously received from the Create Session Request message, in order to determine whether or not the fifth control plane Serving GPRS Support Node fully qualified Tunnel end identifier corresponds to the first control plane Serving GPRS Support Node fully qualified Tunnel end identifier.

The method may further comprise:
- in response to a determination that the fifth control plane Serving GPRS Support Node fully qualified Tunnel end identifier corresponds to the first control plane Serving GPRS Support Node fully qualified Tunnel end identifier, comparing the fifth GPRS Tunnelling Protocol header sequence number to the sixth GPRS Tunnelling Protocol header sequence number;
- in response to a determination that the fifth GPRS Tunnelling Protocol header sequence number corresponds to the sixth GPRS Tunnelling Protocol header sequence number, determining the Delete Session Response message corresponds to the Delete Session Request message; and in response to a determination that the Delete Session Response message corresponds to the Delete Session Request message, deleting from the memory allocation the first evolved packet system bearer identity, the first control plane Serving GPRS Support Node fully qualified Tunnel end identifier, the first control plane Serving Gateway fully qualified Tunnel end identifier and the updated user plane Serving Gateway fully qualified Tunnel end identifier or the updated user plane Serving GPRS Support Node fully qualified Tunnel end identifier.

The present disclosure also provides a monitoring probe for identifying a user plane identifier of a user device, the monitoring probe comprising:

a control plane message monitor, which:

monitors a Serving Gateway over an S4 interface for receipt of a Create Session Request message comprising a first control plane Serving GPRS Support Node fully qualified Tunnel end identifier and an International mobile subscriber identity or Globally Unique Temporary Identifier, and a first user plane identifier; and monitors the SGW over the S4 interface for receipt of a Create Session Response message comprising a second control plane Serving GPRS Support Node fully qualified Tunnel end identifier and a second user plane identifier, in response to receipt of the Create Session Request message;

a control plane identifier comparator, which compares the first control plane Serving GPRS Support Node fully qualified Tunnel end identifier to the second control plane Serving GPRS Support Node fully qualified Tunnel end identifier in order to determine whether or not the first control plane Serving GPRS Support Node fully qualified Tunnel end identifier corresponds to the second control plane Serving GPRS Support Node fully qualified Tunnel end identifier in response to receipt of the Create Session Response message; and a user plane identifier output, which outputs the first control plane Serving GPRS Support Node fully qualified Tunnel end identifier, the first user plane identifier and the second user plane identifier to a same memory allocation of a memory device such that the first and second user plane identifiers are identified as the user plane identifiers of a user device, in response to a determination that the first control plane Serving GPRS Support Node fully qualified Tunnel end identifier corresponds to the second control plane Serving GPRS Support Node fully qualified Tunnel end identifier.

The control plane message monitor may further monitor the Serving Gateway for one or more user plane data packets exchanged over the S4 interface or a S12 interface connecting the Serving Gateway with a Radio Network Controller which is further connected with at least one base station in a wireless communication network; and the control plane identifier comparator may identify the one or more user plane data packets as belonging to a given session directly associated with one of the output user plane identifiers in response to a determination that the one or more user plane data packets from the S4 or the S12 interface include one of the user plane identifiers of the user device.

The control plane message monitor may further obtain the International mobile subscriber identity or the Globally Unique Temporary Identifier, a first control plane Serving Gateway fully qualified Tunnel end identifier and a first evolved packet system bearer identity associated with a default bearer for the user device from the Create Session Request message; and the user plane identifier output may output the International mobile subscriber identity or the Globally Unique Temporary Identifier, the first evolved packet system bearer identity, the first control plane Serving GPRS Support Node fully qualified Tunnel end identifier, the first control plane Serving Gateway fully qualified Tunnel end identifier and the first user plane identifier in the memory allocation of the memory device.

The first user plane identifier may be a user plane Serving GPRS Support Node fully qualified Tunnel end identifier; the second user plane identifier is a user plane Serving Gateway fully qualified Tunnel end identifier, or a user plane Radio Network Controller fully qualified Tunnel end identifier; and each fully qualified Tunnel end identifier may comprise a fully qualified Tunnel end identifier of a network device and an Internet Protocol address.

The control plane message monitor may further monitor the Serving Gateway over the S4 interface for receipt of a Modify Bearer Request message comprising a third control plane Serving GPRS Support Node fully qualified Tunnel end identifier and a third user plane identifier of the network device; the control plane identifier comparator may compare the third control plane Serving GPRS Support Node fully qualified Tunnel end identifier to the first control plane Serving GPRS Support Node fully qualified Tunnel end identifier in order to determine whether or not the third control plane Serving GPRS Support Node fully qualified Tunnel end identifier corresponds to the first control plane Serving GPRS Support Node fully qualified Tunnel end identifier, in response to receipt of the Modify Bearer Request message by the control plane message monitor; and the user plane identifier output may output the third user plane identifier of the network device as an updated user plane fully qualified Tunnel end identifier of the Serving GPRS Support Node or the Radio Network Controller, in response to the determination that the third control plane Serving GPRS Support Node fully qualified Tunnel end identifier corresponds to the first control plane Serving GPRS Support Node fully qualified Tunnel end identifier.

The control plane message monitor may monitor the Serving Gateway over the S4 interface for receipt of a Modify Bearer Response message comprising a fourth control plane Serving GPRS Support Node fully qualified Tunnel end identifier and a fourth user plane identifier of the Serving Gateway, in response to receipt of the Modify Bearer Request message; the control plane identifier comparator may compare the fourth control plane Serving GPRS Support Node fully qualified Tunnel end identifier to the third control plane Serving GPRS Support Node fully qualified Tunnel end identifier in order to determine whether or not the fourth control plane Serving GPRS Support Node fully qualified Tunnel end identifier corresponds to the third control plane Serving GPRS Support Node fully qualified Tunnel end identifier, in response to receipt of the Modify Bearer Response message by the control plane message monitor; the control plane identifier comparator may compare a third GPRS Tunnelling Protocol sequence number received from the Modify Bearer Request message to a fourth GPRS Tunnelling Protocol sequence number received from the Modify Bearer Response message, in order to determine whether or not the third GPRS Tunnelling Protocol sequence number corresponds to the fourth GPRS Tunnelling Protocol sequence number, in response to a determination that the fourth control plane Serving GPRS Support Node fully qualified Tunnel end identifier corresponds to the third control plane Serving GPRS Support Node fully qualified Tunnel end identifier; the control plane identifier comparator may determine the fourth control plane Serving GPRS Support Node fully qualified Tunnel end identifier corresponds to the third control plane Serving GPRS Support Node fully qualified Tunnel end identifier, in response to a determination that the third GPRS Tunnelling Protocol sequence number corresponds to the fourth GPRS Tunnelling Protocol sequence number; and the user plane identifier output may output the fourth user plane identifier of the Serving Gateway as an updated user plane Serving Gateway fully qualified Tunnel end identifier for the Serving Gateway.

The control plane message monitor may monitor the Serving Gateway over the S4 interface for receipt of a Delete Session Request Message comprising a second control plane Serving Gateway fully qualified Tunnel end identifier and a fifth GPRS Tunnelling Protocol header sequence number; the control plane identifier comparator may compare the second control plane Serving Gateway fully qualified Tunnel end identifier to the first control plane Serving Gateway fully qualified Tunnel end identifier received from the Create Session Request message in order to determine whether or not the Delete Session Request Message corresponds to the Create Session Request message, in response to receipt of the Delete Session Request Message by the control plane message monitor; the control plane message monitor may obtain the fifth GPRS Tunnelling Protocol header sequence number from the Delete Session Request Message, in response to a determination that the Delete Session Request Message corresponds to the Create Session Request message; the control plane message monitor may monitor the Serving GPRS Support Node over the S4 interface for receipt of a Delete Session Response Message comprising a fifth control plane Serving GPRS Support Node fully qualified Tunnel end identifier and a sixth GPRS Tunnelling Protocol header sequence number; and the control plane identifier comparator may compare the fifth control plane Serving GPRS Support Node fully qualified Tunnel end identifier to the first control plane Serving GPRS Support Node fully qualified Tunnel end identifier previously received from the Create Session Request message, in order to determine whether or not the fifth control plane Serving GPRS Support Node fully qualified Tunnel end identifier corresponds to the first control plane Serving GPRS Support Node fully qualified Tunnel end identifier, in response to receipt of the Delete Session Response Message.

The control plane identifier comparator may compare the fifth GPRS Tunnelling Protocol header sequence number to the sixth GPRS Tunnelling Protocol header sequence number, in response to a determination that the fifth control plane Serving GPRS Support Node fully qualified Tunnel end identifier corresponds to the first control plane Serving GPRS Support Node fully qualified Tunnel end identifier; the control plane identifier comparator may determine the Delete Session Response message corresponds to the Delete Session Request message, in response to a determination that the fifth GPRS Tunnelling Protocol header sequence number corresponds to the sixth GPRS Tunnelling Protocol header sequence number; and the monitoring probe may delete from the memory allocation the first evolved packet system bearer identity, the first control plane Serving GPRS Support Node fully qualified Tunnel end identifier, the first control plane Serving Gateway fully qualified Tunnel end identifier and the updated user plane Serving Gateway fully qualified Tunnel end identifier or the updated user plane Serving GPRS Support Node fully qualified Tunnel end identifier, in response to a determination that the Delete Session Response message corresponds to the Delete Session Request message.

BRIEF DESCRIPTION OF DRAWINGS

Embodiments of the disclosure will now be described by way of example only with reference to the accompanying drawings, in which.

DETAILED DESCRIPTION

Figure 1:
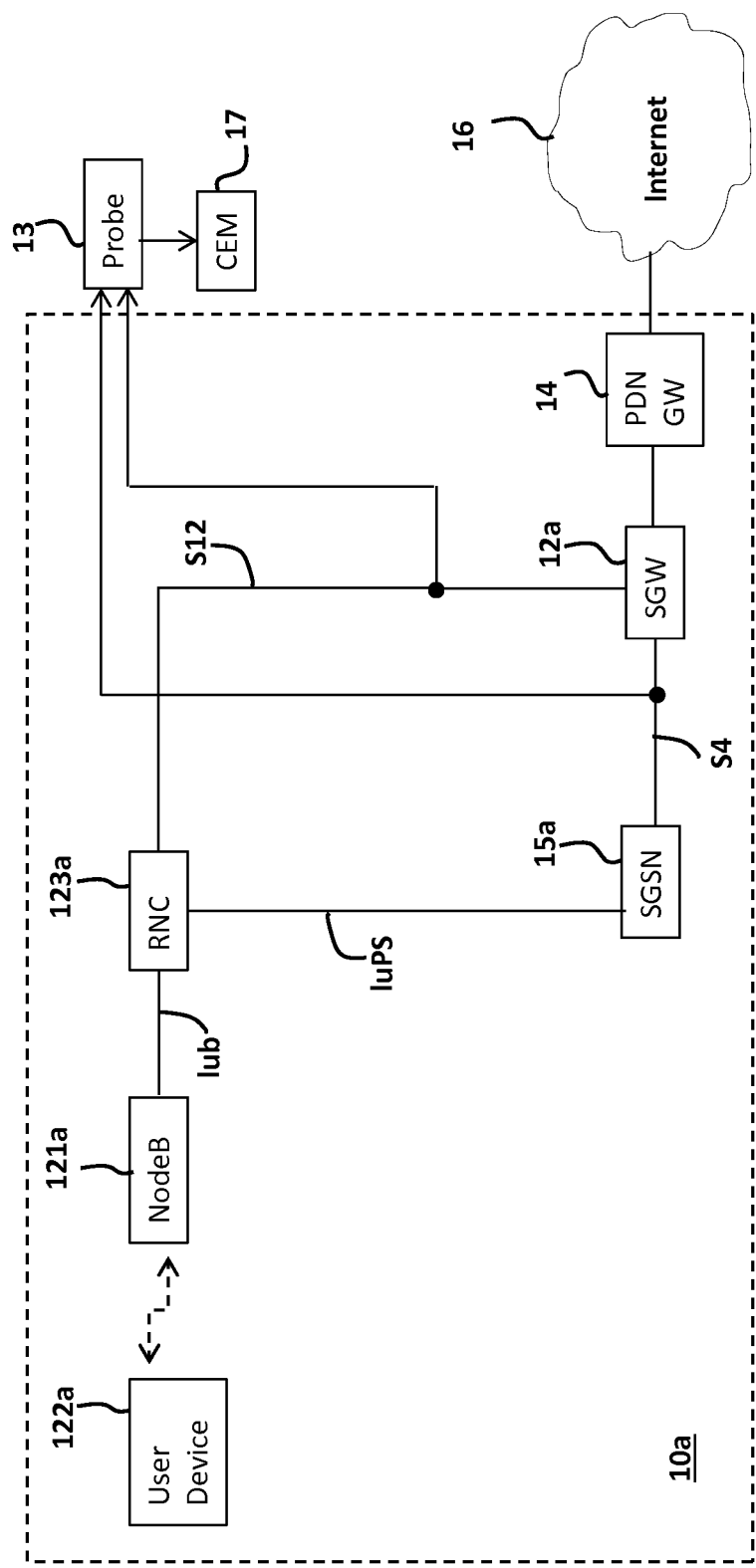
FIG. 1 is a schematic diagram illustrating a network in connection with a monitoring probe according to one embodiment of the disclosure.

Throughout this specification, unless the context requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps. Thus, in the context of this specification, the term "comprising" means "including principally, but not necessarily solely".

Referring to the accompanying drawings, there is illustrated a monitoring probe 13 for identifying a user plane identifier (for example, a user plane Serving Gateway (SGW) Fully Qualified Tunnel End Identifier (F-TEID) and/or a user plane Serving GPRS support node (SGSN) F-TEID of a user device 122a (that is, a User Equipment (UE)) of a network 10a. The monitoring probe 13 is also capable of identifying a Radio Network Controller (RNC) F-TEID when a direct tunnelling function is enabled and when the bearer is established by control plane signalling/messages.

Persons skilled in the art will appreciate that user plane SGW F-TEID includes a user plane SGW IP address and a user plane SGW Tunnelling End Identity (S-GW TEID).

Similarly, a user plane SGSN F-TEID includes a user plane SGSN IP address and a user plane Serving GPRS support node Tunnelling End Identity (SGSN TEID); and a RNC F-TEID includes a user plane RNC IP address and a user plane RNC TEID.

When in operation, the monitoring probe 13 monitors one or more network devices of the network 10a for receipt of at least two control plane messages. Each of the control plane messages comprises at least one control plane identifier. The monitoring probe 13 compares the control plane identifiers of the first and second control plane messages respectively so as to determine whether or not the first and second control plane identifiers correspond to each other. If it is determined that the first and second control plane identifiers received from the first and second control plane messages respectively, correspond to each other, monitoring probe 13 outputs the user plane identifier such that a first user plane identifier received from the first control plane message is identified as the user plane identifier of user device 122a, and/or a second user plane identifier received from the second control plane message is also identified as the user plane identifier of user device 122a. In fact, the first user identifier is the user plane identifier for the user datagram in GPRS Tunnelling Protocol (GTP) tunnel in a downlink direction; the second user identifier is the user plane identifier for the user datagram in GTP tunnel in an uplink direction. The first control plane identifier of the first control plane message is the control plane identifier in the downlink direction, and the second control plane identifier uniquely identifies the bearer to be established as associated with the user device. The user device identifier also uniquely identifies user device 122a in the network 10a permanently, or within a pre-determined or a temporary period.

The monitoring probe identifies a user plane identifier of a user device in a network that conforms to the Third Generation Partnership Project (3GPP) LTE standard. Many terms mentioned in this specification are technical terms defined by the 3GPP. For example, the terms "user plane" and "control plane" refer respectively to the user plane architecture and the control plane architecture of the radio protocol architecture of the 3GPP LTE standard. Persons skilled in the art will appreciate that user data is carried on the user plane and that control/signalling information is carried on the control plane.

Persons skilled in the art will also appreciate that the monitoring probe is typically a passive monitoring probe that does not directly transmit to any network device or devices monitored by the monitoring probe. Alternatively, the monitoring probe may be an active monitoring probe that interacts directly with one or more network device or devices.

FIG. 1 is a schematic diagram illustrating a monitoring probe 13 for identifying the user plane identifier of a user device 122a in a network 10a. The user device 122a is connected to a NodeB 121a of network 10a, and data may be communicated between user device 122a and NodeB 121a. Persons skilled in the art will appreciate that data between user device 122a and NodeB 121a is typically communicated over a radio channel on an air interface in the form of a Uu interface.

NodeB 121a is connected to a RNC 123a of network 10a which in turn is connected to a SGW 12a of network 10a via an S12 interface. Control plane messages are communicated between NodeB 121a and RNC 123a on a control plane interface in the form of a Iub interface. Similarly, control plane messages are also communicated between the RNC 123a and the SGSN 15a in the form of a IuPS interface. It should be noted that both control plane messages and user plane data will be transmitted over the IuPS interface. Control plane messages are also communicated between SGSN 15a and SGW 12a in the form of an S4 interface. It should be noted that some control plane messages and user plane data may be transmitted over the S4 interface.

The SGW 12a is also connected to a Packet Data Network Gateway (PDN GW) 14 which is further connected to Internet 16. User plane messages/datagrams are communicated between SGW 12a, RNC 123a and NodeB 121a on a user plane interface in the form of an S12 interface when Direct Tunnelling (or Direct Tunnel Flag in control plane message) is enabled. When there is no Direct Tunneling user plane messages/datagrams are communicated between SGW 12a, SGSN 15a and RNC 123a on a user plane interface in the form of an S4 interface. Here, SGSN 15a may be called an S4-SGSN and is capable of acting like a mobility management entity (MME) network device in network 10a.

Persons skilled in the art will appreciate that data may be bi-directionally communicated between any of these two devices. For example, data communicated between user device 122a and NodeB 121a may be in either an uplink direction from user device 122a to NodeB 121a or in a downlink direction from NodeB 121a to user device 122a. Similarly, data communicated between user device 122a and any server in Internet 16 may be transmitted in either an uplink direction from RNC 123a via SGSN 15a to SGW 12a, or transmitted in a downlink direction from SGW 12a via SGSN 15a to RNC 123a. Alternatively, data communicated between user device 122a and any server in Internet 16 may be transmitted in either an uplink direction from RNC 123a over the S12 interface to SGW 12a, or transmitted in a downlink direction from the SGW 12a over the S12 interface to RNC 123a.

Monitoring probe 13 is connected to the S4 interface between SGSN 15a and SGW 12a of network 10a, and monitoring probe 13 monitors (or in other words "sniffs") the S4 interface on both control plane and user plane between NodeB 121a and SGW 12a for control plane messages or packets communicated between NodeB 121a and SGW 12a on the S4 interface. Monitoring probe 13 is also connected to the S12 interface between SGW 12a and RNC 123a, and monitoring probe 13 monitors the S12 interface only on user plane between SGW 12a and RNC 123a for user plane datagrams/packets communicated between SGW 12a and RNC 123a on the S12 interface.

Monitoring probe 13 is also connected to a Customer Experience Management (CEM) system 17. Monitoring probe 13 outputs at least one user plane identifier to CEM system 17 such that the user plane identifier can be identified by CEM system 17 as the user plane identifier of user device 122a. Monitoring probe 13 may also be configured to transmit or report information (such as statistical data of traffic flow(s) derived from the user plane messages or packets communicated on the S1-U interface, and/or the control plane messages on the S1-MME interface and/or on the S11 interface) to CEM system 17.

In an alternative embodiment monitoring probe 13 may not be connected to all of the interfaces mentioned above. For example, in an alternative embodiment, monitoring probe 13 may be connected only to SGSN 15a on the S4 interface, and only monitor SGSN 15a for control plane messages transmitted from SGSN 15a to SGW 12a on the S4 interface. In another alternative embodiment, monitoring probe 13 may also be connected to other network device(s) or interface(s) in network 10a. For example, monitoring probe 13 may also be connected to the S11 interface (not shown) between a MME (not shown) and SGW 12a, and monitor the S11 interface between the MME and SGW 12a for control plane messages or packets communicated between the MME and SGW 12a on the S11 interface. In another example, the monitoring probe 13 may also be connected to the S1-U interface (not shown) between a NodeB (not shown) and SGW 12a, and monitor the S1-U interface between the NodeB and SGW 12a for user plane messages or packets communicated between the NodeB and SGW 12a on the S1-U interface.

In FIG. 1, NodeB 121a and user device 122a are part of the UUTRAN portion of network 10a. SGSN 15a, SGW 12a and PDN GW 14 are part of the Evolved Packet Core (EPC) portion of network 10a.

Figure 2:
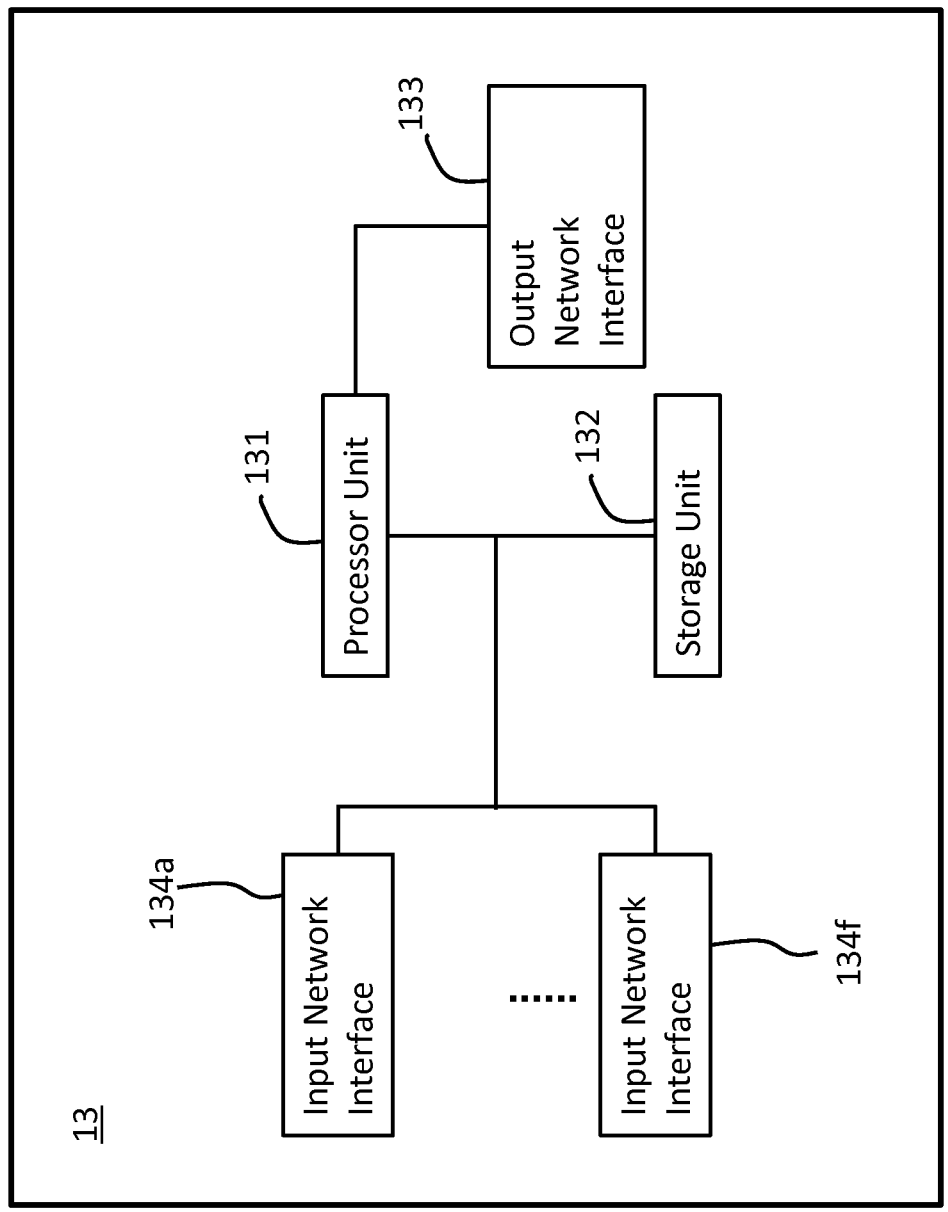
FIG. 2 is a schematic diagram of physical components of the monitoring probe of FIG. 1.

FIG. 2 is a schematic diagram of the physical components of monitoring probe 13. Monitoring probe 13 includes a processor unit 131, a storage unit 132, an output network interface 133, and one or more input network interfaces 134a . . . 134f. Monitoring probe 13 typically includes more than one input network interface 134. However, persons skilled in the art will appreciate that monitoring probe 13 may include only a single input network interface 134. For example, when monitoring only control plane messages transmitted from SGSN 15a to SGW 12a on the S4 interface, monitoring probe 13 may have only one input network interface 134.

Each of the input network interfaces 134a . . . 134f is connected to a respective one of SGW 12a, SGSN 15a and RNC 123a on a high-speed link. Processor unit 131 is configured to implement (or execute) a number of software modules based on program code and/or data stored in storage unit 132. In particular, storage unit 132 stores program code for implementing software modules for identifying a user plane identifier of user device 122a.

Figure 3:
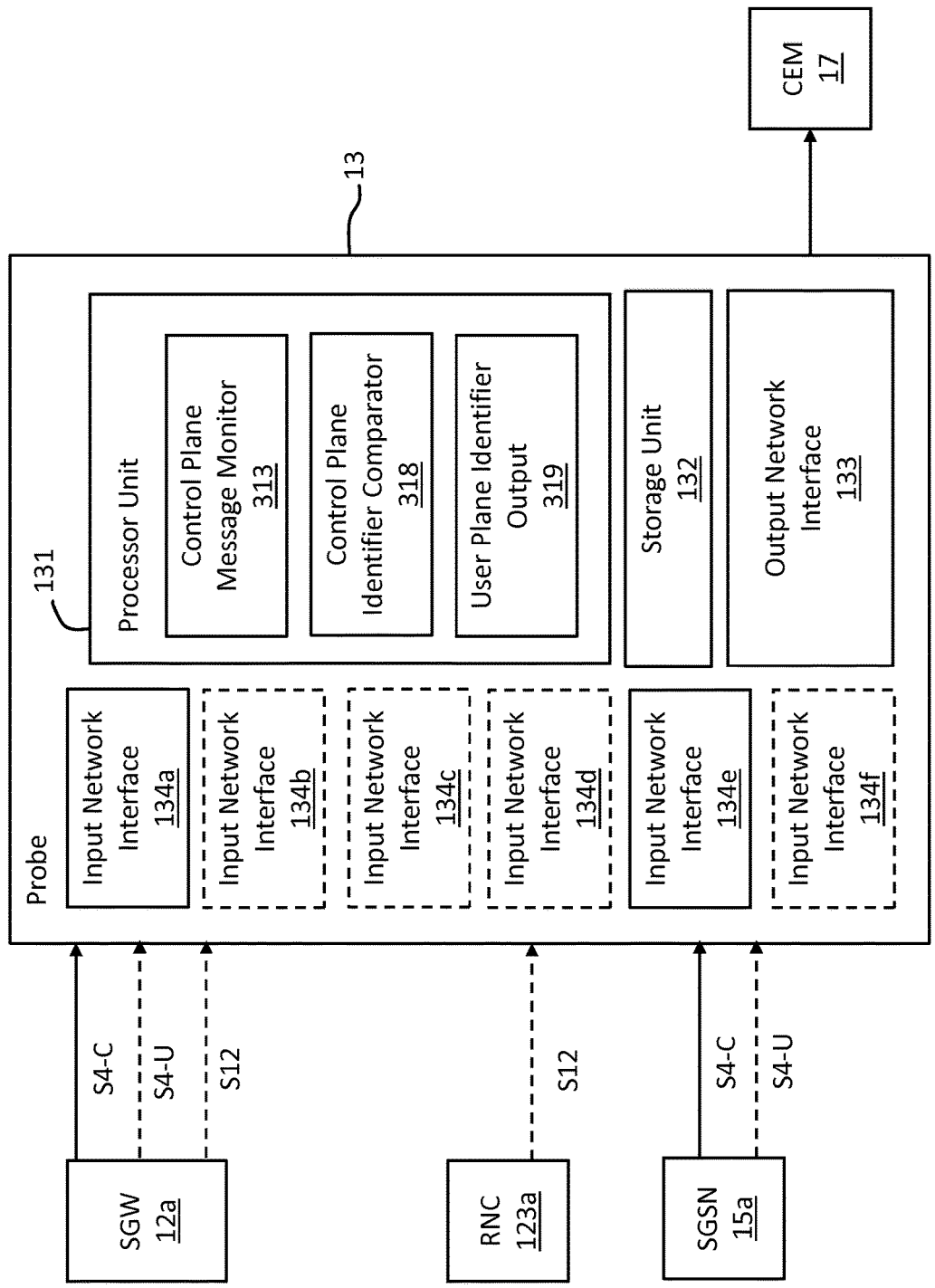
FIG. 3 is a schematic diagram of the functional components of the monitoring probe of FIG. 1.

FIG. 3 is a schematic diagram of the functional components of monitoring probe 13 for identifying the user plane identifier of user device 122a in network 10a. In this embodiment the functional components are software modules implemented by processor unit 131. However, persons skilled in the art will appreciate that one or more of the functional components could alternatively be implemented in some other way, for example by one or more dedicated circuits.

One of the software modules implemented by processor unit 131 is a control plane message monitor 313. Control plane message monitor 313 monitors one or more network devices of network 10 a for receipt of at least two control plane messages. Each of the control plane messages comprises at least one control plane identifier. Also, at least one of the control plane messages comprises at least one user device identifier.

In a first embodiment of monitoring probe 13, control plane message monitor 313 first monitors SGSN 15a or SGW 12a for a first control plane message comprising a first control plane identifier, a second control plane identifier and a user device identifier. The first control plane message can be a Create Session Request message transmitted over the S4 interface between SGSN 15a and a corresponding SGW 12a (that is, a SGW 12a in communication with SGSN 15a over the S4 interface). The first control plane identifier may be a SGSN control plane F-TEID (which is the downlink control plane identifier associated with user device 122a). When monitoring probe 13 is in operation, control plane message monitor 313 monitors the SGW 12a via input network interface 134 in communication with SGSN 15a for receipt of a Create Session Request message. If the first control plane message is a Create Session Request message, the first control plane identifier is a SGSN control plane F-TEID in the Attach Request message, and the user device identifier is either an International Mobile Subscriber Identity (IMSI) or a Globally Unique Temporary Identity (GUTI). The second control plane identifier extracted from the first control message by control plane message monitor 313 may be an evolved packet system bearer identifier (EBI).

In response to obtaining the first control plane message comprising the first control plane identifier, the second control plane identifier and the user device identifier, monitoring probe 13 also associates the first control plane identifier, the second control plane identifier and the user device identifier for user device 122a by linking them and storing them in memory allocation, such as in storage unit 132.

In response to receipt of the first control plane message, control plane message monitor 313 then monitors SGW 12a over the S4 interface for receipt of a second control plane message comprising a third control plane identifier and a user plane identifier. The second control plane message may be a Create Session response message comprising (i) a third control plane identifier in the form of a control plane SGW F-TEID and (ii) a user plane identifier in the form of user plane SGW F-TEID.

Another of the software modules implemented by processor unit 131 is a control plane identifier comparator 318. Control plane identifier comparator 318 compares the first control plane identifier received by control plane message monitor 313 with the third control plane identifier subsequently received by control plane message monitor 313 in order to determine whether or not the first control plane identifier received by control plane message monitor 313 corresponds to the third control plane identifier subsequently received by control plane message monitor 313. Control plane identifier comparator 318 makes this comparison in response to control plane message monitor 313 receiving the third control plane identifier. Further, when control plane identifier comparator 318 determines that the first and third control plane identifiers correspond to each other, control plane identifier comparator 318 may also determine that the first control plane message corresponds to the second control plane message.

Thus, when monitoring probe 13 is in operation, control plane identifier comparator 318 compares (i) the control plane SGSN F-TEID of the Create Session Request message received by control plane message monitor 313 from SGSN 15a to (ii) the control plane SGSN F-TEID of the Create Session Response Message received by control plane message monitor 313 from SGW 12a, and determines whether or not (i) corresponds to (ii) based on the comparison.

Specifically, control plane message monitor 313 obtains the control plane SGSN F-TEID as the first control plane identifier from the GTP message body of the first control plane message. For example, control plane SGSN F-TEID is received from the "Sender F-TEID for Control Plane: S4 SGSN GTP-C interface" from "Create Session Request" message in order to capture a control plane SGSN F-TEID. Also, in a bearer context within the "Create Session Request" message, control plane message monitor 313 obtains "S4-U SGSN F-TEID" in order to capture S4 SGSN user plane F-TEID as the user plane SGSN F-TEID. Control plane message monitor 313 may also obtain the control plane SGSN F-TEID from the GTP header of the corresponding second control plane message. In this embodiment, control plane identifier comparator 318 also checks the message type, for example checking whether the message type of the first control plane message is Create Session Request message, and also checking whether the message type of the corresponding second control plane message is Create Session Response message.

In an alternative second embodiment comprising all steps of the above mentioned first embodiment, if control plane message monitor 313 determines that Direct Tunnel Flag was enabled in the Create Session Request message, control plane message monitor 313 monitors user plane data between RNC 123a and SGW 12a over a user plane portion of version 1 of GTP (abbreviated as GTPv1) on the S12 interface.

If control plane message monitor 313 determines that the Direct Tunnel Flag is not enabled, then control plane message monitor 313 only monitors user plane data between SGSN 15a and SGW 12a over GTPv1 (over the S4 interface). In this case, the user plane data of user device 122a will be transmitted over the S4 interface, and SGSN 15a forwards downlink user datagram to RNC 123a which further forwards downlink user datagram to NodeB 121a; and the uplink user datagram will also be transmitted over the S4 interface from NodeB 121a via RNC 123a to SGW 12a.

In another example, control plane message monitor 313 also obtains "Sender F-TEID for Control Plane: S11/S4 SGW GTP-C interface" from the "Create Session Response" message in order to capture control plane SGW F-TEID. Control plane message monitor 313 also obtains "S4-U SGW F-TEID" or "S12 SGW F-TEID" from the "Create Session Response" message in order to capture user plane SGW F-TEID.

In the first embodiment, control plane message monitor 313 also obtains user plane SGSN F-TEID from the Create Session Request message and obtains user plane SGW F-TEID from the Create Session Response message. In response to the determination that the first control plane message correspond to the second control plane message, processor unit 131 also implements a user plane identifier output 319 which can associate the user plane SGSN F-TEID with the user plane SGW F-TEID and further with the extracted user device identifier for user device 122a.

As indicated above, control plane SGSN F-TEID of the first control plane message and the second control plane message are used to determine whether or not the first control plane message and the second control plane message are inter-related. A control plane identifier other than the control plane SGSN F-TEID may be used to determine whether or not the first control plane message and the second control plane message are inter-related. For example, in an alternative embodiment, a control plane GTP header sequence number and the EBI of the first control plane message and the second control plane message may be used to determine whether or not the first control plane message and the second control plane message are inter-related.

In an alternative third embodiment comprising all steps of the above mentioned first embodiment, in order to ensure that the first control plane message corresponds to the second control plane message, control plane message monitor 313 may also obtain a first GTP header sequence number of the first control plane message and a second GTP header sequence number of the second control plane message. Then, control plane identifier comparator 318 may compare (iii) the first GTP header sequence number extracted from the first control plane message to (iv) the second GTP header sequence number extracted from the second control plane message as part of the determination that the first control plane message corresponds to the second control plane message. When control plane identifier comparator 318 determines that (iii) corresponds to (iv) based on the comparison, after the determination that (i) corresponds to (ii), control plane identifier comparator 318 may determine that the first and second control plane messages correspond to each other.

In an alternative fourth embodiment comprising all steps of the above mentioned first and second embodiments, in order to strictly ensure that the first control plane message corresponds to the second control plane message, control plane message monitor 313 may also obtain EBI respectively from the first and second control plane messages. For instance, after determining that (i) corresponds to (ii) and that (iii) corresponds to (iv), control plane message monitor 313 may extract a first EBI (such as the second control plane identifier) from the Create Session Request message and extract a second EBI from the Create Session Response message; then, control plane identifier comparator 318 may determine whether (v) the first EBI is equivalent to (vi) the second EBI. When control plane identifier comparator 318 determines that (v) equivalent to (vi) based on comparison, control plane identifier comparator 318 may further determine that the first and second control plane messages correspond to each other. In this fourth embodiment, EBI is used by control plane identifier comparator 318 as a secondary check.

User plane identifier output 319, in response to a determination by control plane identifier comparator 318 that the first control plane identifier received by control plane message monitor 313 corresponds to the second control plane identifier received by control plane message monitor 313, outputs the user plane identifier received by control plane message monitor 313 such that the user plane identifier is identified as the user plane identifier of the user device 122a. User plane identifier output 319 may also associate the user device identifier, the first control plane identifier and the user plane identifier by storing them in the same memory allocation for future retrieval and comparison.

In a fifth embodiment comprising all steps of the above mentioned first embodiment, upon a determination by control plane identifier comparator 318 that (i) the control plane SGSN F-TEID of either the Create Session Request message received by control plane message monitor 313 from SGSN 15a corresponds to (ii) the control plane SGSN F-TEID of the Create Session Response message received by control plane message monitor 313 from SGW 12a, user plane identifier output 319 outputs (a) either the user plane SGSN F-TEID from SGSN 15a or the user plane SGW F-TEID received by control plane message monitor 313 from SGW 12a, or (b) all user plane SGSN F-TEID, the user plane SGW F-TEID received by control plane message monitor 313, such that the user plane SGSN F-TEID and the user plane SGW F-TEID are identified with the user device identifier (that is, either the IMSI or GUTI) of user device 122a received by control plane message monitor 313 from SGSN 15a.

The user plane identifier of user device 122 a output by user plane identifier output 319 is communicated via an output network interface 133 of monitoring probe 13 to CEM system 17. The CEM system 17 receives the user plane identifier of user device 122 a output by output network interface 133 to identify the data packets of user device 122 a communicated between SGW 12 a and SGSN 15 a, or between SGW 12 a and RNC 123 a in the user plane (that is, on the S4 interface between SGW 12 a and SGSN 15 a) based on the user plane identifier (that is, the user plane SGW F-TEID, the user plane SGSN F-TEID, or the user plane RNC F-TEID) received by The CEM system 17, and to perform an analysis of the data packets of user device 122 a identified by the CEM system 17. Persons skilled in the art will appreciate that the data packets communicated between SGW 12 a and SGSN 15 a on the S4 interface or between SGW 12 a and RNC 123 a on the S12 interface may be encapsulated in a GTPv1 tunnel or an IP packet, and may be identified by a user plane TEID in a GTPv1 header or a user plane IP address in an IP header (such as a user plane SGW TEID in a GTPv1 header or a user plane SGW IP address in an IP header for data packets transmitted from SGSN 15 a to SGW 12 a in the uplink case, or by a user plane SGSN in a GTPv1 header or a user plane SGSN IP address in an IP header for data packets transmitted from SGW 12 a to SGSN 15 a in the downlink case).

In addition to implementing the above mentioned software modules, processor unit 131 also stores in storage unit 132 data and/or information comprising or derived from the data packets (such as the user plane identifier) received by monitoring probe 13. For example, processor unit 131 may store in storage unit 132 the identifiers received by the probe for building a mapping table for enabling subscribers (such as the CEM system 17) of monitoring probe 13 to identify user specific tunnels (that is, specific logical connections of users) traversed on the user plane. In other words, processor unit 131 can use the subscribers' user plane identifiers stored in storage unit 132 to identify one or more user plane messages (traversed over the S4/S12 interface) as belonging to a given session directly associated with the output user plane identifier.

In one embodiment, monitoring probe 13 may include either one input network interface 134 in communication with an SGW 12a, or two input network interfaces 134 in communication with SGW 12a and a corresponding SGSN 15a respectively. That is, an embodiment may include input network interfaces 134 in communication with one or all of a SGW 12a, a corresponding SGSN 15 and a corresponding RNC 123. (that is, the network devices indicated by dotted lines in FIG. 3) of the network 10a.

Messages other than the first control plane message and the second control plane message may be received by control plane message monitor 313 of monitoring probe 13 while control plane message monitor 313 is monitoring SGW 12a, RNC 123a, or SGSN 15a, or all of SGW 12a, RNC 123a, and SGSN 15. For example, control plane message monitor 313 may receive a Create Session Response message from SGW 12a after receiving a first control plane message in the form of a Create Session Request message from SGSN 15a, while control plane message monitor 313 is monitoring for a second control plane message in the form of a Create Session Response message from SGW 12a.

Monitoring probe 13 may associate identifiers from different messages. For example, monitoring probe 13 may associate a user plane SGSN F-TEID, a control plane SGSN F-TEID and a EBI received from the Create Session Request message with the IMSI (as the user device identifier) received from the Create Session Request message. Monitoring probe 13 may associate identifiers with one another in different ways. For example, a user plane SGW F-TEID, a control plane SGW F-TEID, and a EBI received from a Create Session Response message may be associated with an IMSI received from a Create Session Request message by storing the user plane SGW F-TEID, the control plane SGW F-TEID, the EBI in association with the IMSI in storage unit 132. In another example, the user plane SGSN F-TEID, the control plane SGSN F-TEID, the user plane SGW F-TEID, the control plane F-TEID, the EBI and the IMSI may be associated with each other by outputting the user plane SGSN F-TEID, the control plane SGSN F-TEID, the user plane SGW F-TEID, the control plane F-TEID and the EBI together with the IMSI, or by outputting the user plane SGSN F-TEID, the control plane SGSN F-TEID, the user plane SGW F-TEID, the control plane F-TEID, the EBI and the IMSI one after another.

Also, in the above-mentioned first to fifth embodiments, control plane message monitor 313 monitors for at least two control plane messages transmitted by the SGSN 15a only, or transmitted by the SGW 12a and the SGSN 15a, or transmitted by all of SGW 12a, SGSN 15a and RNC 123a. Control plane message monitor 313 may, in an alternative embodiment monitor: (i) for more than two control plane messages (that is, in addition to a first control plane message and a second control plane message), and (ii) another network device or devices (that is, other than just SGSN 15a or SGW 12a or SGSN 15a and SGW 12a or SGSN 15a, RCN 123a and SGW 12a).

In an alternative sixth embodiment of monitoring probe 13, control plane message monitor 313 may monitor:

(i) first a SGSN 15a or a SGW 12a for receipt of a first control plane message in the form of a Create Session Request message comprising a user device identifier in the form of an IMSI/GUTI and a first control plane identifier in the form of control plane SGSN F-TEID, a second control plane identifier in the form of a GTP header sequence number and a first user plane identifier in the form of a user plane SGSN F-TEID;

(ii) then a corresponding SGW 12a (that is, a SGW 12a in communication with SGSN 15a on an S4 interface between SGW 12a and SGSN 15a) for receipt of a second control plane message in the form of a Create Session Response message comprising a third control plane identifier in the form of a control plane SGSN F-TEID, a second user plane identifier in the form of a user plane SGW F-TEID and a fourth control plane identifier in the form of a GTP header sequence number;

(iii) followed by SGSN 15a or SGW 12a for receipt of a third control plane message in the form of a Modify Bearer Request message comprising a fifth control plane identifier in the form of the control plane SGSN F-TEID, a sixth control plane identifier in the form of SGW F-TEID, a seventh control plane identifier in the form of a GTP header sequence number and a third user plane identifier in the form of the user plane SGSN F-TEID; and (iv) finally SGW 12a for a fourth control plane message in the form of a Modify Bearer Response message comprising an eighth control plane identifier in the form of the control plane SGW F-TEID, a ninth control plane identifier in the form of the control plane SGSN F-TEID, a tenth control plane identifier in the form of GTP header sequence number and a fourth user plane identifier in the form of the user plane SGW F-TEID.

In this sixth embodiment of monitoring probe 13, control plane identifier comparator 318 firstly compares (1) the GTP header sequence number in the Create Session Request message received from SGSN 15a to the GTP header sequence number in the Create Session Response message received from SGW 12a and determines whether or not the two GTP header sequence numbers correspond to each other. Upon a determination that the two GTP sequence numbers do correspond to each other, control plane identifier comparator 318 further compares (2) the control plane SGSN F-TEID in the Create Session Request message received from the SGSN 15a to the control plane SGSN F-TEID in the Create Session Response received from the SGW 12a and determines whether or not the two SGSN F-TEIDs are equal. Upon a determination that the two SGSN F-TEIDs are equal, control plane identifier comparator 318 compares (3) the control plane SGSN F-TEID in the Modify Bearer message received from SGSN 15a to control plane SGSN F-TEID in the Create Session Response message received from SGW 12a, and determines whether or not the two control plane SGSN F-TEIDs are equal. If determinations (1)-(3) above are all positive, then control plane identifier comparator 318 may determine that the Modify Bearer message corresponds to the Create Session Response message and also corresponds to the corresponding Create Session Request message.

In addition, in the sixth embodiment, upon a determination that the Modify Bearer message received from SGSN 15a corresponds to Create Session Response message received from SGW 12a (that is, the result of the determination following comparisons (1)-(3) above), control plane identifier comparator 318 further compares (4) the GTP header sequence number in the Modify Bearer Request message received from SGSN 15a to the GTP header sequence number in the Modify Bearer Response message received from SGW 12a and determines whether or not the two GTP header sequence numbers correspond to each other. Upon a determination that the two GTP sequence numbers do correspond to each other, control plane identifier comparator 318 further compares (5) the control plane SGSN F-TEID in the Modify Bearer Request message received from SGSN 15a to the control plane SGSN F-TEID in the Modify Bearer Response received from SGW 12a. Upon a determination that the result of (4) and (5) are positive, user plane identifier output 319 outputs (a) the user plane SGSN F-TEID in the Modify Bearer Request message received by control plane message monitor 313 from SGSN 15a, or (b) the user plane SGW F-TEID in the Modify Bearer Response message received by control plane message monitor 313 from SGW 12a, such that the user plane SGSN F-TEID or the user plane SGW F-TEID is identified with the user device identifier (that is, the IMSI or GUTI) of user device 122a previously received by control plane message monitor 313a from SGW 12a.

Comparisons (1), (2) and (3), or (4) and (5) in the sixth embodiment of monitoring probe 13 may not be performed in sequence. For example, control plane identifier comparator 318 may compare the control plane SGSN F-TEID in the Modify Bearer Request message received from SGSN 15a to the control plane SGSN F-TEID in the Modify Bearer Response received from the SGW 12a before comparing the GTP header sequence number in the Modify Bearer Request message received from SGSN 15a to the GTP header sequence number in the Modify Bearer Response message received from SGSN 15a.

Figure 4:
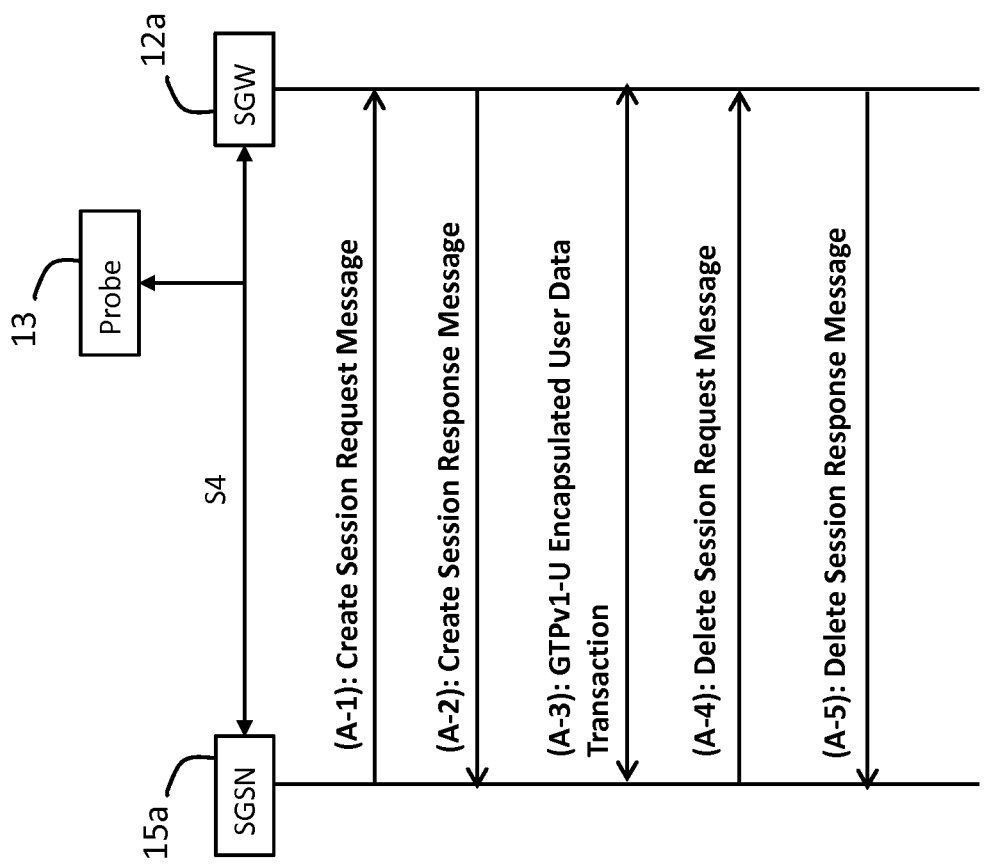
FIG. 4 is a flow diagram of an embodiment of a method of identifying a user plane identifier of a user device in a network by the monitoring probe of FIG. 1.

FIG. 4 is a flow diagram of an embodiment of a method of identifying a user plane identifier of a user device 122a in network 10a by monitoring probe 13. In this seventh embodiment of monitoring probe 13, user device 122a is identified by a user device identifier in the form of an IMSI/GUTI received from a control plane message in the form a Create Session Request message, and there is no Modify Bearer Request/Response messages received by control plane message monitor 313 of monitoring probe 13 before the user plane session is disconnected by transaction of Delete Session Request/Response messages.

At step (A-1), control plane message monitor 313 implemented by processor unit 131 monitors, via an input network interface 134 of monitoring probe 13, a SGW 12a of network 10a on the S4 interface between the SGW 12a and a corresponding SGSN 15a for receipt of a first control plane message in the form of a Create Session Request message transmitted from SGSN 15a to SGW 12a. In this seventh embodiment, the Create Session Request message includes a user device identifier (that is, an identifier of user device 122a) in the form of an IMSI/GUTI, a first control plane identifier in the form of a control plane SGSN F-TEID, a second control plane identifier in the form of EBI, a third control plane identifier in the form of a GTP header sequence number and a user plane identifier in the form of a user plane SGSN F-TEID. Persons skilled in the art will appreciate that the Create Session Request message may include other identifiers or control plane parameters.

At step (A-2), control plane message monitor 313 monitors SGW 12a via the above mentioned input network interface 134 for receipt of a Create Session Response message transmitted from SGW 12a to SGSN 15a on the S4 interface, where the Create Session Response message comprises control plane identifiers in the form of a control plane SGW F-TEID, a control plane SGSN F-TEID, a GTP header sequence number and a EBI. Control plane identifier comparator 318 implemented by monitoring probe 13 then compares the control plane SGSN F-TEID received from the Create Session Response message to the control plane SGSN F-TEID received from the Create Session Request message, and determines whether or not the control plane SGSN F-TEID received from the Create Session Response message corresponds to the control plane SGSN F-TEID received from the Create Session Request message. Upon a determination by control plane identifier comparator 318 that the control plane SGSN F-TEID received from the Create Session Response message corresponds to the control plane SGSN F-TEID received from the Create Session Request message, monitoring probe 13 associates the control plane SGSN F-TEID received from the Create Session Response message with the IMSI/GUTI received from the Create Session Request message. Further, monitoring probe 13 also associates the control plane SGW F-TEID received from the Create Session Response message with the IMSI/GUTI received from the Create Session Request message.

Control plane SGSN F-TEID received from the Create Session Response message may be associated with the IMSI/GUTI received from the Create Session Request message in different ways. For example, the control plane SGSN F-TEID may be associated with the IMSI/GUTI, by storing the control plane SGSN F-TEID in association with the IMSI/GUTI in storage unit 132. Another example may be to output the control plane SGSN F-TEID together with the IMSI/GUTI. Similarly, the control plane SGSN F-TEID and the control plane SGW F-TEID may be associated with the IMSI by storing the control plane SGSN F-TEID and the control plane SGW F-TEID in association with the IMSI/GUTI in storage unit 132. Alternatively, the control plane SGSN F-TEID, the control plane SGW F-TEID and the EBI may be associated with the IMSI/GUTI by storing the control plane SGSN F-TEID, the control plane SGW F-TEID and the EBI in association with the IMSI/GUTI in storage unit 132.

Upon a determination by control plane identifier comparator 318 that the control plane SGSN F-TEID received from the Create Session Response message corresponds to the control plane SGSN F-TEID received from the Create Session Request message, monitoring probe 13, user plane identifier output 319 implemented by processor unit 131 outputs one or both of the user plane identifiers (that is, the user plane SGW F-TEID, and/or the user plane SGSN F-TEID) received from the Create Session Request message or the Create Session Response, such that the user plane identifier or identifiers are identified as a user plane identifier or identifiers of user device 122a (that is, such that the user plane identifier or identifiers are identified with the user device identifier (that is, the IMSI/GUTI) of the user device 122a received by control plane message monitor 313 from SGSN 15a). Additionally, monitoring probe 13 also associates the control plane SGSN F-TEID received from the Create Session Request message and/or the user plane SGW F-TEID received from the Create Session Response message with the IMSI/GUTI received from the Create Session Request message.

The user plane identifier or identifiers (that is, the user plane SGW TEID, the user plane SGW IP Address, or the user plane SGW F-TEID) are then output by user plane identifier output 319 to the CEM system 17, via output network interface 133 of monitoring probe 13 for identifying data packets of user device 122 a from NodeB 121 a, via RNC 123 a, to SGW 12 a in the user plane (that is, on the S12 interface between RNC 123 a and SGW 12 a) based on the user plane identifier or identifiers. Also, the user plane identifier or identifiers (that is, the user plane RNC TED, the user plane RNC IP Address or the user plane RNC F-TEID) are then output by user plane identifier output 319 to the CEM system 17, via output network interface 133 of monitoring probe 13 for identifying data packets of user device 122 a from SGW 12 a, via SGSN 15 a, to NodeB 121 in the user plane (that is, on the S4 interface between SGW 12 a and SGSN 15 a) based on the user plane identifier or identifiers.

At step (A-3), control plane message monitor 313 monitors, via another input network interface 134, SGW 12a on the S4 interface between SGW 12a and SGSN 15a for receipt of GTPv1-U Encapsulated User Data Transaction(s) transmitted from SGW 12a to SGSN 15a or vice versa. The GTPv1-U Encapsulated User Data Transaction(s) may include one or more uplink user plane data transmissions and corresponding one or more downlink user plane data transmissions associated encapsulated in GTPv1-U tunnelling carrying either the previously identified user plane SGSN F-TEID or user plane SGW F-TEID.

At step (A-4), control plane message monitor 313 monitors, via the above mentioned input network interface 134, for receipt of a Delete Session Request message comprising control plane identifiers in the form of a control plane SGW F-TEID and a control plane SGSN F-TEID and a EBI. Then, control plane identifier comparator 318 compares the control plane SGW F-TEID received from the Delete Session Request message to the control plane SGW F-TEID received from the Create Session Response message previously received by control plane message monitor 313, and determines whether or not the two control plane identifiers correspond to each other.

Upon a determination by control plane identifier comparator 318 that the control plane SGW F-TEID received from the Delete Session Request message corresponds to the control plane SGW F-TEID received from the Create Session Response message previously received by control plane message monitor 313, control plane identifier comparator 318 further obtains, via control plane message monitor 313, the EBI and the GTP header sequence number from the Delete Session Request message. The EBI and the GTP header sequence number received from the Delete Session Request message can be later compared by control plane identifier comparator 318 to corresponding identifiers/parameters in a corresponding Delete Session Response message so as to confirm that the Delete Session Response message corresponds to the previously received Delete Session Request message.

At step (A-5), control plane message monitor 313 monitors SGSN 15a, via the above mentioned input network interface 134, for receipt of a corresponding Delete Session Response message transmitted from SGW 12a to SGSN 15a on the S4 interface, the Delete Session Response message comprising control plane identifiers in the form of a control plane SGSN F-TEID and a GTP header sequence number. Control plane identifier comparator 318 then compares the control plane SGSN F-TEID received from the Delete Session Response message to the control plane SGSN F-TEID received from the Create Session Request message previously received by control plane message monitor 313 and determines whether or not the two control plane identifiers correspond to each other.

Upon a determination that the control plane SGSN F-TEID received from the Delete Session Response message corresponds to the control plane SGSN F-TEID received from the Create Session Request message previously received by control plane message monitor 313, control plane message monitor 313 further compares the GTP header sequence number received from the Delete Session Response message to the GTP header sequence number received from the Create Session Response message previously received by the control plane message monitor 313. Further, upon a determination that the GTP header sequence number received from the Delete Session Request message corresponds to the GTP header sequence number previously received from the Delete Session Request message, control plane identifier comparator 318 determines that the Delete Session Response message corresponds to the Delete Session Request message based on the determinations that the control plane SGSN F-TEID corresponds to the control plane SGSN F-TEID directly associated with user device 122a, both the Delete Session Request and the corresponding Delete Session Response messages are received by control plane message monitor 313 and the GTP header sequence numbers respectively received from the Delete Session Request and the corresponding Delete Session Response messages correspond to each other. Subsequently, control plane identifier comparator 318 determines that the dedicated bearer and/or the default bearer associated with the EBI received from the Delete Session Request is terminated, and therefore monitoring probe 13 can delete the association of IMSI/GUTI, the user plane SGW F-TEID, the user plane SGSN F-TEID and the EBI from the memory allocation of storage unit 132.

In an alternative eighth embodiment of monitoring probe 13, control plane identifier comparator 318 compares the control plane SGSN F-TEID received from the Delete Session Request message to the control plane SGSN F-TEID stored in association with the device identifier IMSI/GUTI of user device 122a in a memory allocation of storage unit 132, and then compares the GTP header sequence number received respectively from the Delete Session Request message and the Delete Session Response message, so as to determine that the Delete Session Request message corresponds to the Delete Session Response message.

Persons skilled in the art will appreciate that the method depicted in FIG. 4 is advantageous in that it does not involve monitoring (or "sniffing") packets on the IuPS interface between SGSN 15a and RNC 123a or on the Iub interface between each NodeB 121a and RNC 123a.

Figure 5:
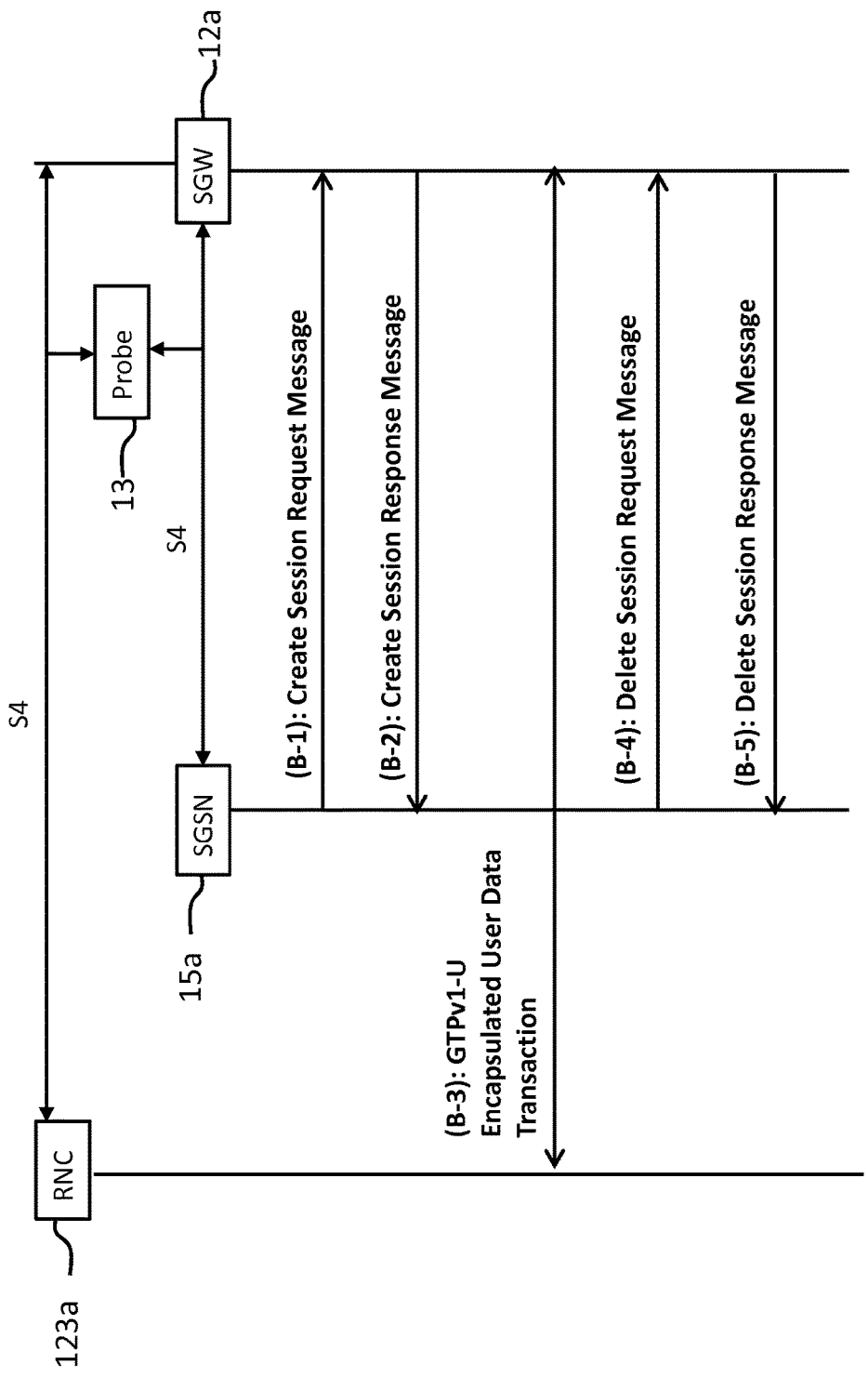
FIG. 5 is a flow diagram of another embodiment of a method of identifying a user plane identifier of a user device in a network by the monitoring probe of FIG. 1.

FIG. 5 is a flow diagram of another embodiment of a method of identifying a user plane identifier of a user device 122a in a network 10a by monitoring probe 13. Like the method of FIG. 4, user device 122a is identified by a user device identifier in the form of an IMSI/GUTI and there is no Modify Bearer Request/Response messages received by control plane message monitor 313 of monitoring probe 13 before the user plane session is disconnected by transaction of Delete Session Request/Response messages.

At step (B-1), control plane message monitor 313 monitors, via input network interface 134 of monitoring probe 13, SGSN 15a of network 10a on the S4 interface between SGSN 15a and a corresponding SGW 12 of network 10a, for receipt of a first control plane message in the form of a Create Session Request message transmitted from NodeB 121a to an MME (not shown). In this ninth embodiment, the Create Session Request message includes a user device identifier (that is, an identifier of user device 122a) in the form of an IMSI/GUTI, a first control plane identifier in the form of a control plane SGSN F-TEID, a second control plane identifier in the form of EBI, a third control plane identifier in the form of a GTP header sequence number and a user plane identifier in the form of a user plane SGSN F-TEID. Persons skilled in the art will appreciate that the Create Session Request message may include other identifiers or control plane parameters.

In this ninth embodiment, control plane message monitor 313 obtains the GTP header sequence number from the GTP header, and also obtains an EBI and a "S4-U SGW F-TEID/ S12 SGW F-TEID" in a Bearer Context within the "Create Session Request" message in order to capture the user plane SGW F-TEID. The "S4-U SGW F-TEID" refers to the user plane SGW F-TEID and the "S12 SGW F-TEID" refers to the user plane SGW F-TEID for user device 122a. Also, control plane identifier comparator 318 checks whether a Direct Tunnelling Flag was enabled or not. The Direct Tunnelling Flag is detected by looking at a bit corresponding to the Director Tunnelling in the indication flags of the "Create Session Request" message. Upon a determination that the Direct Tunneling was set, control plane message monitor 313 obtains the "S4-U SGW F-TEID" in the Bearer Context within the "Create Session Request" message in order to capture the user plane SGW F-TEID, and also obtains "S12 RNC F-TEID" from in the Bearer Context within the "Create Session Request" message in order to capture the user plane RNC F-TEID. On the other hand, upon a determination that the Direct Tunneling was not set, control plane message monitor 313 obtains the "S12 SGW F-TEID" in the Bearer Context within the "Create Session Request" message in order to capture the user plane SGW F-TEID.

The following procedures are illustrated for operations when Direct Tunneling is set. At step (B-2), control plane message monitor 313 monitors SGW 12a via the above mentioned input network interface 134 for receipt of a Create Session Response message transmitted from SGW 12a to SGSN 15a on the S4 interface, where the Create Session Response message comprises control plane identifiers in the form of a control plane SGW F-TEID, a control plane SGSN F-TEID, a GTP header sequence number and a EBI.

Upon a determination by control plane identifier comparator 318 that the control plane SGSN F-TEID received from the Create Session Response message corresponds to the control plane SGSN F-TEID received from the Create Session Request message, user plane identifier output 319 of monitoring probe 13 outputs the control plane SGSN F-TEID received from the Create Session Response message with the IMSI/GUTI received from the Create Session Request message in the same memory allocation in storage unit 132. Further, user plane identifier output 319 also outputs the control plane SGW F-TEID received from the Create Session Response message in the same memory allocation where the IMSI/GUTI received from the Create Session Request message is stored.

Upon a determination by control plane identifier comparator 318 that the control plane SGSN F-TEID received from the Create Session Response message corresponds to the control plane SGSN F-TEID received from the Create Session Request message, user plane identifier output 319 implemented by processor unit 131 outputs one or both of the user plane identifiers (that is, the user plane SGW F-TEID, and/or the user plane RNC F-TEID) received from the Create Session Request message or the Create Session Response, such that the user plane identifier or identifiers are identified as a user plane identifier or identifiers of user device 122a (that is, such that the user plane identifier or identifiers are identified with the user device identifier (that is, the IMSI/GUTI) of the user device 122a received by control plane message monitor 313 from SGSN 15a). Further, user plane identifier output 319 of monitoring probe 13 also outputs the control plane SGSN F-TEID and the user plane RNC F-TEID received from the Create Session Request message in the same memory allocation which stores the IMSI/GUTI received from the Create Session Request message, and also outputs the user plane SGW F-TEID received from the Create Session Response message in the same memory allocation which stores the IMSI/GUTI received from the Create Session Request message.

The user plane RNC F-TEID received from the Create Session Request message and the user plane SGW F-TEID received from the Create Session Response message may be associated with the IMSI/GUTI received from the Create Session Request message in different ways. For example, user plane identifier output 319 of monitoring probe 13 may associate the user plane RNC F-TEID with the IMSI/GUTI by storing the user plane RNC F-TEID in association with the IMSI/GUTI in storage unit 132. Another example involves outputting the user plane RNC F-TEID together with the IMSI/GUTI to the same memory allocation in storage unit 132. Similarly, the control plane SGSN F-TEID, the control plane SGW F-TEID, the user plane SGW F-TEID, the user plane RNC F-TEID and the EBI corresponding to user device 122a may be associated with the IMSI/GUTI, by storing the control plane SGSN F-TEID, the control plane SGW F-TEID, the user plane SGW F-TEID, the user plane RNC F-TEID and the EBI in association with the IMSI/GUTI in storage unit 132.

The user plane identifier or identifiers (that is, the user plane SGW TEID, the user plane SGW IP Address, or the user plane SGW F-TEID) are then output by user plane identifier output 319 to OEM system 17, via output network interface 133 of monitoring probe 13 for identifying data packets of user device 122a from NodeB 121a, via RNC 123a, to SGW 12a in the user plane (that is, on the S12 interface between RNC 123a and SGW 12a) based on the user plane identifier or identifiers. Also, the user plane identifier or identifiers (that is, the user plane RNC TEID, the user plane RNC IP Address or the user plane RNC F-TEID) are then output by user plane identifier output 319 to OEM system 17, via output network interface 133 of monitoring probe 13 for identifying data packets of user device 122a from SGW 12a, via SGSN 15a, to NodeB 121 in the user plane (that is, on the S4 interface between SGW 12a and SGSN 15a) based on the user plane identifier or identifiers.

At step (B-3), control plane message monitor 313 monitors, via another input network interface 134 of monitoring probe 13, SGW 12a on the S12 interface between SGW 12a and RNC 123a for receipt of GTPv1-U Encapsulated User Data Transaction(s) transmitted from SGW 12a to RNC 123a or vice versa. The GTPv1-U Encapsulated User Data Transaction(s) may include one or more uplink user plane data transmissions and corresponding one or more downlink user plane data transmissions associated encapsulated in GTPv1-U tunnelling carrying either the previously identified user plane RNC F-TEID or user plane SGW F-TEID.

At step (B-4), like the procedures illustrated previously for step (A-4) in FIG. 4, control plane message monitor 313 monitors SGW 12a, via the above mentioned input network interface 134 for receipt of a Delete Session Request message comprising control plane identifiers in the form of a control plane SGW F-TEID and a control plane SGSN F-TEID and EBI. Then, control plane identifier comparator 318 compares the control plane SGW F-TEID received from the Delete Session Request message to the control plane SGW F-TEID received from the Create Session Response message previously received by control plane message monitor 313, and determines whether or not the two control plane identifiers correspond to each other.

Upon a determination by control plane identifier comparator 318 that the control plane SGW F-TEID received from the Delete Session Request message corresponds to the control plane SGW F-TEID received from the Create Session Response message previously received by control plane message monitor 313, control plane identifier comparator 318 further obtains, via control plane message monitor 313, the EBI and the GTP header sequence number from the Delete Session Request message. The EBI and the GTP header sequence number received from the Delete Session Request message can be later compared by control plane identifier comparator 318 to corresponding identifiers/parameters in a corresponding Delete Session Response message so as to confirm that the Delete Session Response message corresponds to the previously received Delete Session Request message.

At step (B-5), like the procedures illustrated previously for step (A-5) in FIG. 4, control plane message monitor 313 monitors SGW 12a or SGSN 15a via the above mentioned input network interface 134 for receipt of a corresponding Delete Session Response message transmitted from SGW 12a to SGSN 15a on the S4 interface, the Delete Session Response message comprising control plane identifiers in the form of a control plane SGSN F-TEID and a GTP header sequence number. Then, control plane identifier comparator 318 compares the control plane SGSN F-TEID received from the Delete Session Response message to the control plane SGSN F-TEID received from the Create Session Request message previously received by control plane message monitor 313 and determines whether or not the two control plane identifiers correspond to each other.

Upon a determination that the control plane SGSN F-TEID received from the Delete Session Response message corresponds to the control plane SGSN F-TEID received from the Create Session Request message previously received by control plane message monitor 313, control plane message monitor 313 further compares the GTP header sequence number received from the Delete Session Response message to the GTP header sequence number received from the Create Session Response message previously received by control plane message monitor 313. Further, upon a determination that the GTP header sequence number received from the Delete Session Request message corresponds to the GTP header sequence number previously received from the Delete Session Response message, control plane identifier comparator 318 determines that the Delete Session Response message corresponds to the Delete Session Request message. Subsequently, control plane identifier comparator 318 determines that the dedicated bearer and/or the default bearer associated with the EBI received from the Delete Session Request is cleared/disconnected, and therefore monitoring probe 13 can delete the association of IMSI/GUTI, the user plane SGW F-TEID, the user plane SGSN F-TEID and the EBI from the memory allocation of storage unit 132.

In an alternative tenth embodiment of monitoring probe 13, control plane identifier comparator 318 compares the control plane SGSN F-TEID received from the Delete Session Request message to the control plane SGSN F-TEID stored in association with the device identifier IMSI/GUTI of user device 122a in a memory allocation of storage unit 132, and then compares the GTP header sequence number received respectively from the Delete Session Request message and the Delete Session Response message so as to determine that the Delete Session Request message corresponds to the Delete Session Response message.

Persons skilled in the art will appreciate that the method depicted in FIG. 5 is advantageous in that it does not involve monitoring (or "sniffing") packets on the IuPS interface between SGSN 15a and RNC 123a or on the Iub interface between each NodeB 121a and RNC 123a.

Figure 6:
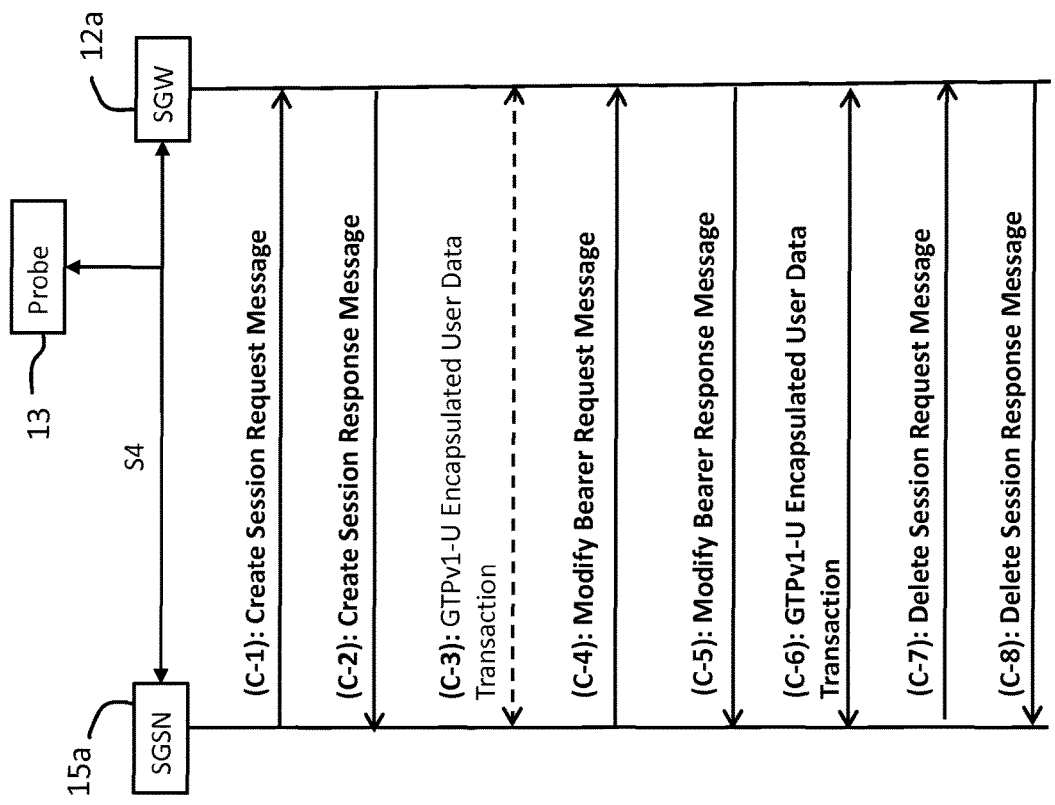
FIG. 6 is a flow diagram of yet another embodiment of a method of identifying a user plane identifier of a user device in a network by the monitoring probe of FIG. 1.

FIG. 6 is a flow diagram of yet another embodiment of a method of identifying a user plane identifier of a user device 122a in a network 10a by monitoring probe 13. The method comprises steps (C-1), (C-2), and (C-3) corresponding to steps (A-1), (A-2), and (A-3) respectively that are described above in connection with FIG. 4. Therefore, steps (C-1) to (C-3) may be performed as described above for steps (A-1) to (A-3).

In this eleventh embodiment user device 122a is identified by a user device identifier in the form of an IMSI/GUTI received from a control plane message in the form of a Create Session Request message at step (C-1). As noted above, steps (C-1), (C-2) and (C-3) in FIG. 6 correspond to steps (A-1), (A-2) and (A-3) respectively in FIG. 4. Control plane identifier comparator 318 of monitoring probe 13 may determine that the Create Session Request message and the corresponding Create Session Response message associated with user device 122a are received by control plane message monitor 313, which sniffs at the S4 interface between SGSN 15a and SGW 12a. Control plane message monitor 313 also obtains the control plane SGSN F-TEID, the control plane SGW F-TEID, the user plane F-TEID, the user plane F-TEID, and the EBI corresponding to a particular GTPv1 session of user device 122. Subsequently, user plane identifier output 319 of monitoring probe 13 outputs the control plane SGSN F-TEID, the control plane SGW F-TEID, the user plane F-TEID, the user plane F-TEID and the EBI in association with the user device identifier IMSI/GUTI of user device 122a in a memory allocation of storage unit 132 and can output the user plane F-TEID, the user plane F-TEID and the EBI in association with the user device identifier IMSI/GUTI to CEM 17.

Thus, the control plane identifiers received by control plane message monitor 313 are associated with the IMSI/GUTI received in the Create Cession Request message by control plane message monitor 313 and the user plane identifiers received by control plane message monitor 313 are outputted to CEM system 17 such that the user plane identifier or identifiers are identified with the IMSI/GUTI.

In this eleventh embodiment, at optional step (C-3) control plane message monitor 313 sniffs the GTPv1-U Encapsulated User Data Transaction(s) transmitted from SGW 12a to SGSN 15a or vice versa on the S4 interface because control plane monitor 313 determines that no Direct Tunneling flag was enabled in the Create Session Request message. The GTPv1-U Encapsulated User Data Transaction(s) may include one or more uplink user plane data transmissions and corresponding one or more downlink user plane data transmissions associated encapsulated in GTPv1-U tunnelling carrying either the previously identified user plane SGSN F-TEID or user plane SGW F-TEID.

At step (C-4), control plane message monitor 313 monitors, via an input network interface 134 of monitoring probe 13, SGSN 15a of network 10 on the S4 interface between SGSN 15a and corresponding SGW 12a of network 10, for receipt of a control plane message in the form of a Modify Bearer Request message transmitted from SGSN 15a to SGW 12a. In this eleventh embodiment, the Modify Bearer Request message includes control plane identifiers in the form of a control plane SGSN F-TEID, a control plane SGW F-TEID, a GTP sequence number and a EBI, and user plane identifiers in the form of a user plane SGSN F-TEID and a user plane SGW F-TEID. Persons skilled in the art will appreciate that the Modify Bearer Request message may include other identifiers or control plane parameters.

At step (C-1) or step (C-2), control plane message monitor 313 obtains the old user plane SGSN F-TEID (e.g., F-TEID_1 including IP_1 & TEID_1) and the old user plane SGW F-TEID (e.g., F-TEID_2 including IP_2 & TEID_2). When control plane message monitor 313 receives the Modify Bearer Request message at step (C-4), apart from a possible change of Quality of Service (QoS) on the current EPS bearer or the GTPv1 session, control plane message monitor 313 receives updated user plane SGSN F-TEID (e.g., F-TEID_3 including IP_3 & TEID_3) and the user plane SGW F-TEID (e.g., F-TEID_4 including IP_4 & TEID_4) received from the Modify Bearer Request message. Specifically, control plane message monitor 313 of monitoring probe 13 looks at a "Bearer Context" within the "Modify Bearer Request" message for a "S12 RNC F-TEID/S4-U SGSN F-TEID" in order to capture a "user plane RNC F-TEID" if a Direct Tunnel was enabled; otherwise, control plane message monitor 313 looks at the user plane SGSN F-TEID present in the previously sent control plane messages such as the Create Session Request message/Create Session Response message.

At step (C-4), control plane identifier comparator 318 also compares the control plane SGSN F-TEID received from the Modify Bearer Request message to the control plane SGSN F-TEID received from the Create Session Request message previously received by control plane message monitor 313, and determines whether or not the two control plane identifiers correspond to each other. Upon a determination that the control plane SGSN F-TEID received from the Modify Bearer Request message corresponds to the control plane SGSN F-TEID received from the Create Session Request message previously received by control plane message monitor 313, control plane message monitor 313 further compares the EBI received from the Modify Bearer Request message to the EBI received from the Create Session Response message previously received by control plane message monitor 313. Further, upon a determination that the EBI received from the Modify Bearer Request message corresponds to the EBI previously received from the Create Session Response message, control plane identifier comparator 318 determines that Modify Bearer Request message corresponds to the Create Session Response message.

In an alternative twelfth embodiment of monitoring probe 13, control plane identifier comparator 318 compares the control plane SGSN F-TEID received from the Modify Bearer Request message to the control plane SGSN F-TEID stored in association with the device identifier IMSI/GUTI of user device 122a in a memory allocation of storage unit 132, and then compares the EBIs received respectively from the Modify Bearer Request message and the Create Session Response message, so as to determine that the Modify Bearer Request message corresponds to the Create Session Response message.

At step (C-5), control plane message monitor 313 monitors SGW 12a, via the above mentioned input network interface 134, for receipt of a Modify Bearer Response message transmitted from SGW 12a to SGSN 15a on the S4 interface, where the Modify Bearer Response message comprises control plane identifiers in the form of a control plane SGSN F-TEID, a GTP header sequence number and a EBI, and a user plane identifier in the form of a user plane SGW F-TEID.

Then, the control plane identifier comparator 318 also compares the control plane SGSN F-TEID received from the Modify Bearer Response message to the control plane SGSN F-TEID received from the Create Session Request message previously received by the control plane message monitor 313 and determines whether or not the two control plane identifiers correspond to each other. Upon a determination that the control plane SGSN F-TEID received from the Modify Bearer Response message corresponds to the control plane SGSN F-TEID received from the Create Session Request message previously received by the control plane message monitor 313, the control plane identifier comparator 318 also compares the GTP header sequence number received from the Modify Bearer Response message to the control plane SGSN F-TEID received from the Modify Bearer Request message previously received by the control plane message monitor 313. Further, upon a determination that the GTP header sequence numbers received from the Modify Bearer Request and the corresponding Modify Bearer Response messages correspond to each other and the GTP header sequence numbers thereof correspond to each other, the user plane identifier output 319 of the monitoring probe 13 determines to update the user plane identifiers associated with the dedicated bearer and/or the default bearer associated with the EBI received from the Modify Bearer Request message, and therefore monitoring probe 13 can update the association of IMSI/GUTI, the user plane SGW F-TEID and the user plane SGSN F-TEID in the memory allocation of the storage unit 132.

In an alternative twelfth embodiment of monitoring probe 13, control plane identifier comparator 318 compares the control plane SGSN F-TEID received from the Modify Bearer Response message to the control plane SGSN F-TEID stored in association with the device identifier IMSI/GUTI of user device 122a in a memory allocation of storage unit 132, and then compares the EBIs received respectively from the Modify Bearer Request message and the Modify Bearer Response message, so as to determine that the Modify Bearer Request message received at step (C-4) corresponds to the Modify Bearer Response message at step (C-5).

In the eleventh or the twelfth embodiment of the monitoring probe 13, when control plane identifier comparator 318 determines that "Indication Flags: Change F-TEID support Indication" (in the "Modify Bearer Request"

received at the step (C-4)) was not enabled, then control plane message monitor 313 does not look for "S12 SGW F-TEID/S4-U SGW F-TEID" in the corresponding "Modify Bearer Response" message.

In the eleventh or the twelfth embodiment of the monitoring probe 13, the method also comprises steps (C-7) and (C-8) which correspond to steps (A-4) and (A-5) respectively in FIG. 4. Therefore, steps (C-7) and (C-8) may be performed as described above for steps (A-4) and (A-5).

Figure 7:
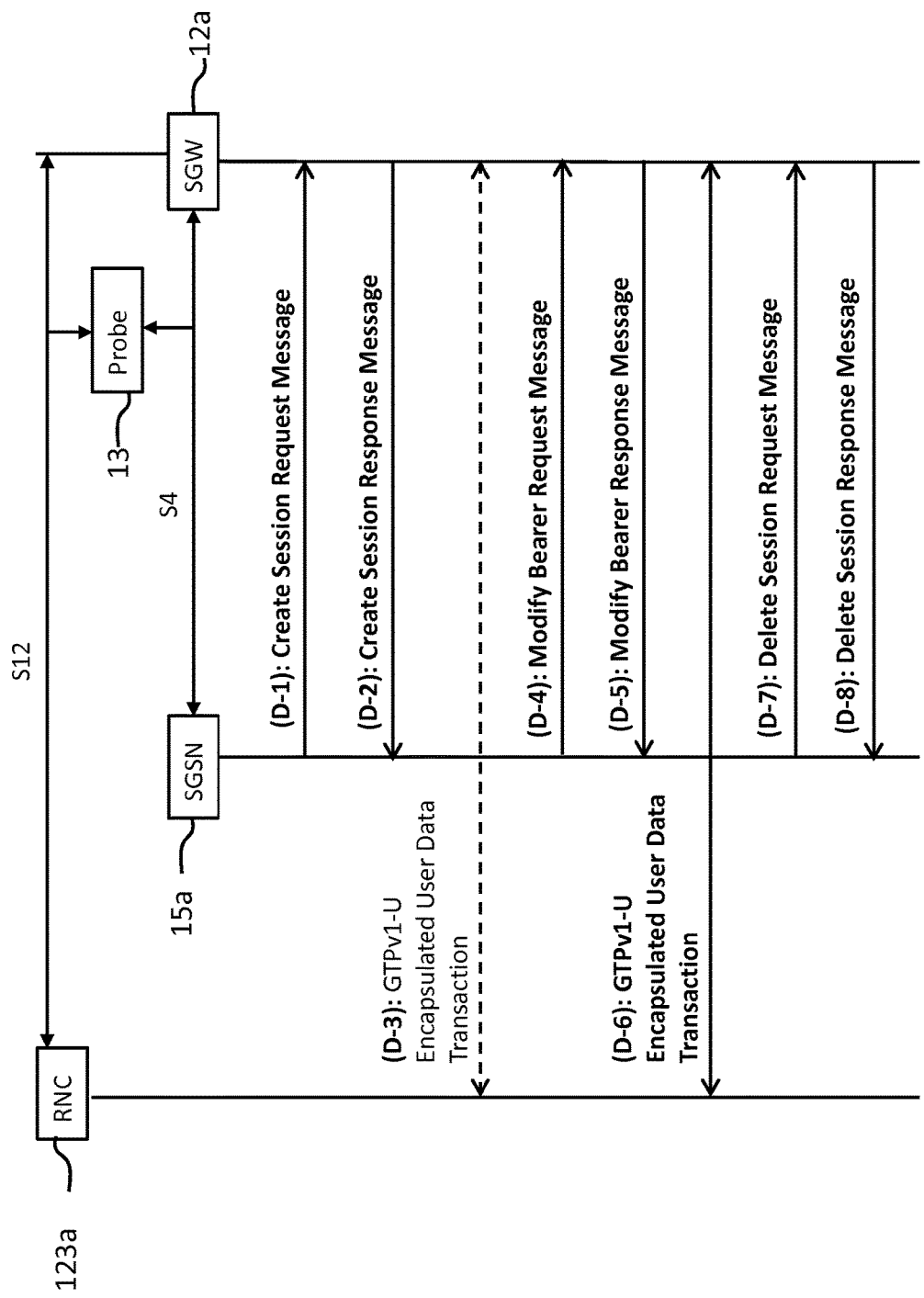
FIG. 7 is a flow diagram of yet another embodiment of a method of identifying a user plane identifier of a user device in a network by the monitoring probe of FIG. 1.

FIG. 7 is a flow diagram of yet another embodiment of a method of identifying a user plane identifier of a user device 122a in a network 10a by monitoring probe 13. The method comprises steps (D-1), (D-2), and (D-3) which correspond to steps (B-1), (B-2), and (B-3) in FIG. 5. Therefore, steps (D-1) to (D-3) may be performed as described above for steps (B-1) to (B-3).

In this thirteenth embodiment user device 122a is identified by a user device identifier in the form of an IMSI/GUTI received from a control plane message in the form a Create Session Request message at step (D-1). Control plane identifier comparator 318 of monitoring probe 13 may determine that a Create Session Request message received at step (D-1) by control plane message monitor 313 on the S4 interface corresponds to a Create Session Response message received at step (D-2) by control plane message monitor 313 on the S4 interface.

Control plane message monitor 313 also obtains, in steps (D-1) and (D-2), the control plane SGSN F-TEID, the control plane SGW F-TEID, the user plane F-TEID, the user plane F-TEID and the EBI corresponding to a particular GTPv1 session of user device 122a. Subsequently, user plane identifier output 319 of monitoring probe 13 outputs the control plane SGSN F-TEID, the control plane SGW F-TEID, the user plane SGSN F-TEID, the user plane SGW F-TEID and the EBI in association with the user device identifier IMSI/GUTI of user device 122a in a memory allocation of storage unit 132, and can also output control plane SGSN F-TEID, the control plane SGW F-TEID, the user plane SGSN F-TEID, the user plane SGW F-TEID and the EBI in association with the user device identifier IMSI/GUTI of user device 122a to CEM 17.

Thus, the control plane identifiers received by control plane message monitor 313 are associated with the IMSI/GUTI received in the Create Cession Request message by control plane message monitor 313 and the user plane identifiers received by control plane message monitor 313 are outputted to CEM system 17 such that the user plane identifier or identifiers are identified with the IMSI/GUTI.

In this thirteenth embodiment, at optional step (D-3), control plane message monitor 313 sniffs the GTPv1-U Encapsulated User Data Transaction(s) transmitted from RNC 123a to SGW 12a or vice versa on the S12 interface because the control plane monitor 313 determines that Direct Tunneling flag was enabled in the Create Session Request message. The GTPv1-U Encapsulated User Data Transaction(s) may include one or more uplink user plane data transmissions and corresponding one or more downlink user plane data transmissions associated encapsulated in GTPv1-U tunnelling carrying either the previously identified user plane SGSN F-TEID or user plane SGW F-TEID.

At step (D-4) control plane message monitor 313 monitors, via an input network interface 134 of monitoring probe 13, SGW 12a of network 10a on the S4 interface between SGSN 15a and a corresponding SGW 12a of network 10a, for receipt of a control plane message in the form of a Modify Bearer Request message transmitted from SGSN 15a to SGW 12a. In this thirteenth embodiment the Modify Bearer Request message includes control plane identifiers in the form of a control plane SGSN F-TEID, a control plane SGW F-TEID, a GTP sequence number and a EBI, and user plane identifiers in the form of a user plane RNC F-TEID and a user plane SGW F-TEID. Persons skilled in the art will appreciate that the Modify Bearer Request message may include other identifiers or control plane parameters.

In this thirteenth embodiment the following procedures are illustrated for the operations when Direct Tunneling was enabled. When control plane message monitor 313 determines that the "Indication Flags: Change F-TEID support Indication" (in the Modify Bearer Request message) is enabled, then user plane identifiers such as "S12 SGW F-TEID/S4-U SGW F-TEID" will only be present in the corresponding "Modify Bearer Response" message. Therefore, control plane message monitor 313 only checks that the "Modify Bearer Response" message is received, and only looks for "S12 RNC F-TEID/S4-U SGSN F-TEID" in the "Modify Bearer Response" message.

At step (D-1) or (D-2) control plane message monitor 313 obtains the old user plane RNC F-TEID (e.g., F-TEID_5 including IP_5 & TEID_5) and the old user plane SGWF-TEID (e.g., F-TEID_2 including IP_2 & TEID_2). When control plane message monitor 313 receives the Modify Bearer Request message at step (C-4), apart from a possible change of Quality of Service (QoS) on the current EPS bearer or the GTPv1 session, control plane message monitor 313 receives updated user plane RNC F-TEID (e.g., F-TEID_6 including IP_6 & TEID_6) and the user plane SGW F-TEID (e.g., F-TEID_4 including IP_4 & TEID_4) received from the Modify Bearer Request message. Specifically, control plane message monitor 313 of monitoring probe 13 looks at a "Bearer Context" within the "Modify Bearer Request" message for a "S12 RNC F-TEID/S4-U SGSN F-TEID" in order to capture a "user plane RNC F-TEID" if a Direct Tunnel was enabled; otherwise, control plane message monitor 313 looks at the user plane SGSN F-TEID present in the previously received control plane messages, such as the Create Session Request message/Create Session Response message.

At step (D-4), control plane identifier comparator 318 also compares the control plane SGSN F-TEID received from the Modify Bearer Request message to the control plane SGSN F-TEID received from the Create Session Request message previously received by control plane message monitor 313 and determines whether or not the two control plane identifiers correspond to each other. Upon a determination that the control plane SGSN F-TEID received from the Modify Bearer Request message corresponds to the control plane SGSN F-TEID received from the Create Session Request message previously received by control plane message monitor 313, control plane message monitor 313 further compares the EBI received from the Modify Bearer Request message to the EBI received from the Create Session Response message previously received by control plane message monitor 313. Further, upon a determination that the EBI received from the Modify Bearer Request message corresponds to the EBI previously received from the Create Session Response message, control plane identifier comparator 318 determines that Modify Bearer Request message corresponds to the Create Session Response message.

In an alternative fourteenth embodiment of monitoring probe 13, control plane identifier comparator 318 compares the control plane SGSN F-TEID received from the Modify Bearer Request message to the control plane SGSN F-TEID stored in association with the device identifier IMSI/GUTI of user device 122a in a memory allocation of storage unit 132, and then compares the EBIs received respectively from the Modify Bearer Request message and the Create Session Response message so as to determine that the Modify Bearer Request message corresponds to the Create Session Response message.

At step (D-5), control plane message monitor 313 monitors SGW 12a, via the above mentioned input network interface 134 for receipt of a Modify Bearer Response message transmitted from SGW 12a to SGSN 15a on the S4 interface, where the Modify Bearer Response message comprises control plane identifiers in the form of a control plane SGSN F-TEID, a GTP header sequence number and a EBI, and a user plane identifier in the form of a user plane SGW F-TEID, or "S12 RNC F-TEID/S4-U SGSN F-TEID" if "Indication Flags: Change F-TEID support Indication" (in the corresponding Modify Bearer Request message) was enabled.

Then, control plane identifier comparator 318 also compares the control plane SGSN F-TEID received from the Modify Bearer Response message to the control plane SGSN F-TEID received from the Create Session Request message previously received by control plane message monitor 313 and determines whether or not the two control plane identifiers correspond to each other. Upon a determination that the control plane SGSN F-TEID received from the Modify Bearer Response message corresponds to the control plane SGSN F-TEID received from the Create Session Request message previously received by control plane message monitor 313, control plane identifier comparator 318 also compares the GTP header sequence number received from the Modify Bearer Response message to the control plane SGSN F-TEID received from the Modify Bearer Request message previously received by control plane message monitor 313. Upon a determination that the GTP header sequence numbers received from the Modify Bearer Request and the corresponding Modify Bearer Response messages correspond to each other and the GTP header sequence numbers thereof correspond to each other, user plane identifier output 319 of monitoring probe 13 determines to update the user plane identifiers associated with the dedicated bearer and/or the default bearer associated with the EBI received from the Modify Bearer Request message, and therefore the monitoring probe 13 can update the association of IMSI/GUTI, the user plane SGW F-TEID and the user plane RNC F-TEID in the memory allocation of storage unit 132.

In an alternative fourteenth embodiment of monitoring probe 13, control plane identifier comparator 318 compares the control plane SGSN F-TEID received from the Modify Bearer Response message to the control plane SGSN F-TEID stored in association with the device identifier IMSI/GUTI of user device 122a in a memory allocation of storage unit 132, and then compares the EBIs received respectively from the Modify Bearer Request message and the Modify Bearer Response message, so as to determine that the Modify Bearer Request message received at step (D-4) corresponds to the Modify Bearer Response message at step (D-5).

In the thirteenth or fourteenth embodiments, the method also comprises steps (D-7) and (D-8) which correspond to steps (B-4) and (B-5) in FIG. 5. Therefore, steps (D-7) and (D-8) may be performed as described above for steps (B-4) and (B-5).

Figure 8:
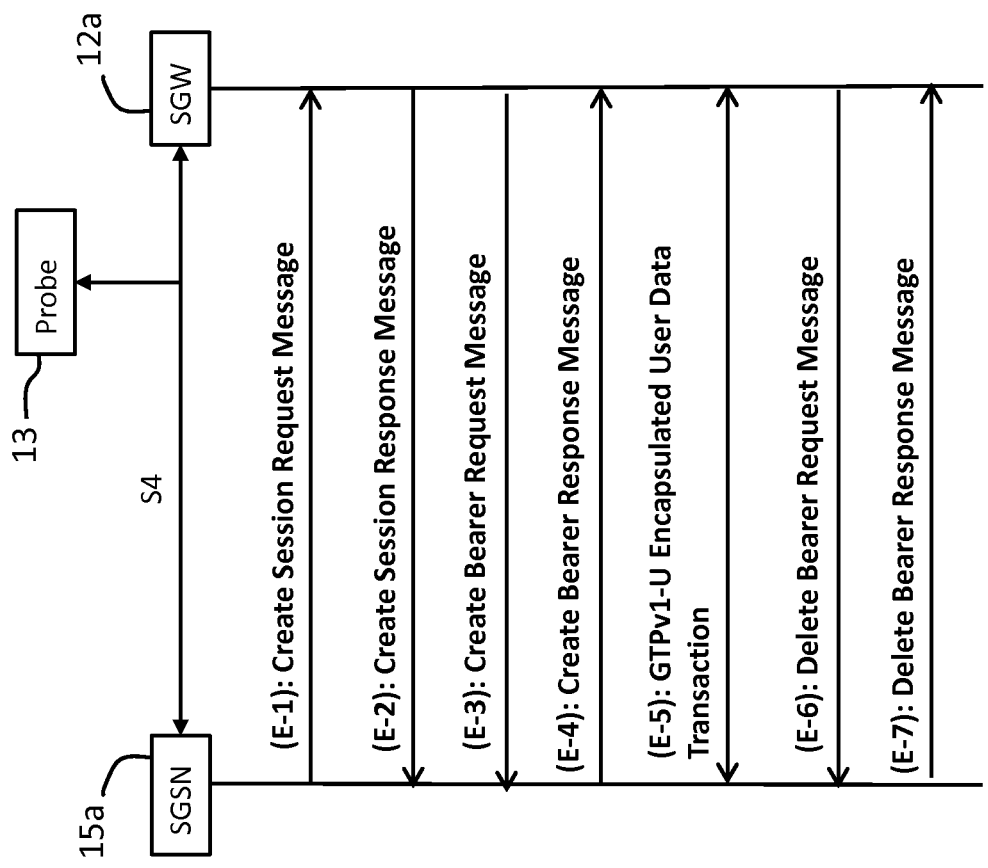
FIG. 8 is a flow diagram of yet another embodiment of a method of identifying a user plane identifier of a user device in a network by the monitoring probe of FIG. 1.

FIG. 8 is a flow diagram of yet another embodiment of a method of identifying a user plane identifier of a user device 122a in a network 10 by monitoring probe 13. The method comprises steps (E-1) and (E-2) which correspond to steps (A-1) and (A-2) respectively in FIG. 4. Therefore, steps (E-1) and (E-2) may be performed as described above for steps (A-1) and (A-2).

In this fifteenth embodiment, user device 122a is identified by a user device identifier in the form of an IMSI/GUTI received from a control plane message in the form a Create Session Request message at step (E-1). Control plane identifier comparator 318 of monitoring probe 13 may determine that a Create Session Request message received at step (E-1) by control plane message monitor 313 on the S4 interface corresponds to a Create Session Response message received at step (E-2) by the control plane monitor 313 on the S4 interface.

In steps (E-1) and (E-2), control plane message monitor 313 also obtains the control plane SGSN F-TEID, the control plane SGW F-TEID, the user plane F-TEID, the user plane F-TEID and the EBI corresponding to a particular GTPv1 session of user device 122a. Subsequently, user plane identifier output 319 of monitoring probe 13 outputs the control plane SGSN F-TEID, the control plane SGW F-TEID, the user plane F-TEID, the user plane F-TEID, and the EBI in association with the user device identifier IMSI/GUTI of user device 122a in a same memory allocation of storage unit 132. User plane identifier output 319 may also output the control plane SGSN F-TEID, the control plane SGW F-TEID, the user plane F-TEID, the user plane F-TEID, and the EBI in association with the user device identifier IMSI/GUTI of user device 122a to CEM 17.

Thus, the control plane identifiers received by control plane message monitor 313 are associated with the IMSI/GUTI received in the Create Cession Request message by control plane message monitor 313 and the user plane identifiers received by control plane message monitor 313 are outputted to CEM system 17 such that the user plane identifier or identifiers are identified with the IMSI/GUTI.

At step (E-3), control plane message monitor 313 monitors, via an input network interface 134 of monitoring probe 13, a SGW 12a in network 10a on the S4 interface between SGW 12a and a corresponding SGSN 15a of network 10a, for receipt of a control plane message in the form of a Create Bearer Request message transmitted from SGW 12a to SGSN 15a. In this fifteenth embodiment, the Create Bearer Request message includes control plane identifiers in the form of a control plane SGSN F-TEID, a GTP sequence number, a Linked Bearer Identity (LBI) and a EBI, and user plane identifiers in the form of a user plane S4-U SGW F-TEID (a user plane SGW F-TEID). Persons skilled in the art will appreciate that the Create Bearer Request message may include other identifiers or control plane parameters.

At step (E-1) or (E-2), control plane message monitor 313 obtains the user plane SGSN F-TEID (e.g., F-TEID_6 including IP_6 & TEID_6) and the user plane SGW F-TEID (e.g., F-TEID_7 including IP_7 & TEID_7) corresponding to a default bearer. When control plane message monitor 313 receives the Create Bearer Request message at step (E-3), control plane message monitor 313 receives another user plane SGW F-TEID (e.g., F-TEID_8 including IP_8 & TEID_8) received from the Create Bearer Request message for a dedicated bearer linked to the default bearer. Specifically, control plane message monitor 313 of monitoring probe 13 obtains the LBI as the default bearer's EPS bearer Identity. Then, control plane message monitor 313 looks at a "Bearer Context" within the "Create Bearer Request" message for a "S12 SGW F-TEID/S4-U SGW F-TEID" in order to capture a "user plane SGW F-TEID", and further looks at the EBI in the "Bearer Context" within the "Create Bearer Request" message as the dedicated bearer's bearer identity.

At step (E-3), control plane identifier comparator 318 compares the control plane SGSN F-TEID received from the Create Bearer Request message to the control plane SGSN F-TEID received from the Create Session Response message previously received by control plane message monitor 313 and determines whether or not the two control plane identifiers correspond to each other. Upon a determination that the control plane SGSN F-TEID received from the Create Bearer Request message corresponds to the control plane SGSN F-TEID received from the Create Session Response message previously received by the control plane message monitor 313, control plane identifier comparator 318 compares the LBI received from the Create Bearer Request message to EBI received from the Create Session Response message previously received by control plane message monitor 313 and determines whether or not the LBI correspond to the EBI received from the Create Session Response message previously received by control plane message monitor 313. Upon a determination that the LBI corresponds to the EBI, control plane message monitor 313 determines that there is a dedicated bearer to be established in association with the default bearer (represented by the LBI). At step (E-3) control plane message monitor 313 also obtains the GTP sequence number from the Create Bearer Request message, which may be used to determine its corresponding Create Bearer Response message.

At step (E-4), control plane message monitor 313 monitors SGW 12a, via the above mentioned input network interface 134 for receipt of a Create Bearer Response transmitted from SGSN 15a to SGW 12a on the S4 interface, where the Create Bearer Response message comprises control plane identifiers in the form of a control plane SGW F-TEID, a GTP header sequence number and a EBI, and user plane identifiers in the form of a user plane SGW F-TEID (e.g., F-TEID_9 including IP_9 & TEID_9) and a user plane SGSN F-TEID (e.g., F-TEID_10 including IP_10 & TEID_10).

Then, control plane identifier comparator 318 also compares the control plane SGW F-TEID received from the Create Bearer Response message transmitted from SGSN 15a to SGW 12a on the S4 interface to the control plane SGW F-TEID received from the Create Session Request message previously received by control plane message monitor 313, and determines whether or not the two control plane identifiers correspond to each other. Upon a determination that the control plane SGW F-TEID received from the Create Bearer Response message corresponds to the control plane SGW F-TEID received from the Create Session Request message previously received by control plane message monitor 313, control plane identifier comparator 318 also compares the GTP header sequence number received from the Create Bearer Response message to the GTP header sequence number received from the Create Bearer Request message previously received by control plane message monitor 313. Upon a determination that the GTP header sequence numbers received from the Create Bearer Request and the corresponding Create Bearer Response messages correspond to each other, user plane identifier output 319 of monitoring probe 13 determines to establish a new record for the user plane identifiers directly related to a dedicated bearer represented the EBI received from the Create Bearer Request/Create Bearer Response message, and therefore the monitoring probe 13 can establish a new record for the established dedicated bearer in storage unit 132. That is, user plane identifier output 319 of monitoring probe 13 outputs the user plane SGW F-TEID (e.g., F-TEID_9) and the user plane SGSN F-TEID (e.g., F-TEID_10) received from the Create Bearer Response message, the EBI and the LBI received from the Create Bearer Request message along with the IMSI/GUTI associated with the default bearer (represented by the LBI) in the memory allocation of storage unit 132.

Also, user plane identifier output 319 of monitoring probe 13 outputs the control plane SGSN F-TEID, the control plane SGW F-TEID, the user plane SGW F-TEID (e.g., F-TEID_9), the user plane SGSN F-TEID (e.g., F-TEID_11), the LBI and the EBI in association with the user device identifier IMSI/GUTI of user device 122a in a memory allocation of storage unit 132, and can output the user plane SGSN F-TEID, the user plane SGW F-TEID, the LBI and the EBI for the dedicated bearer in association with the user device identifier IMSI/GUTI to the CEM system 17.

In this fifteenth embodiment, at step (E-5), control plane message monitor 313 sniffs the GTPv1-U Encapsulated User Data Transaction(s) transmitted from SGSN 15a to SGW 12a or vice versa on the S4 interface. The GTPv1-U Encapsulated User Data Transaction(s) may include one or more uplink user plane data transmissions and corresponding one or more downlink user plane data transmissions associated encapsulated in GTPv1-U tunnelling for the default bearer identified through steps (E-1) and (E-2), or for the dedicated bearer identified through steps (E-3) and (E-4).

At step (E-6), control plane message monitor 313 monitors SGW 12a or SGSN 15a, via the above mentioned input network interface 134 for receipt of a Delete Bearer Request message transmitted from SGW 12a to SGSN 15a on the S4 interface. The Delete Bearer Request message comprises control plane identifiers in the form of a control plane SGSN F-TEID, a GTP sequence number, a LBI and a EBI. Then, control plane identifier comparator 318 compares the control plane SGW F-TEID received from the Delete Bearer Request message to the control plane SGW F-TEID received from the Create Session Response message previously received by control plane message monitor 313 and determines whether or not the two control plane identifiers correspond to each other. Persons skilled in the art will appreciate that the Delete Bearer Request message may include other identifiers or control plane parameters.

Upon a determination by control plane identifier comparator 318 that the control plane SGW F-TEID received from the Delete Bearer Request message corresponds to the control plane SGW F-TEID received from the Create Session Response message previously received by control plane message monitor 313, control plane identifier comparator 318 further obtains, via control plane message monitor 313, the LBI, the EBI and the GTP header sequence number from the Delete Bearer Request message. The LBI, the EBI and the GTP header sequence number received from the Delete Bearer Request message can later be compared by control plane identifier comparator 318 to corresponding identifiers/parameters in a corresponding Delete Bearer Response message, so as to confirm that the Delete Bearer Response message corresponds to the previously received Delete Bearer Request message.

At step (E-7), control plane message monitor 313 monitors SGW 12a, via the above mentioned input network interface 134 for receipt of a corresponding Delete Bearer Response message transmitted from SGSN 15a to SGW 12a on the S4 interface, the Delete Session Response message comprising control plane identifiers in the form of a control plane SGW F-TEID, a GTP header sequence number, a LBI and a EBI. Then, control plane identifier comparator 318 compares the control plane SGW F-TEID received from the Delete Bearer Response message to the control plane SGW F-TEID received from the Create Session Request message previously received by control plane message monitor 313 and determines whether or not the two control plane identifiers correspond to each other. Persons skilled in the art will appreciate that the Delete Bearer Response message may include other identifiers or control plane parameters.

Upon a determination that the control plane SGW F-TEID received from the Delete Bearer Response message corresponds to the control plane SGSN F-TEID received from the Create Session Request message previously received by control plane message monitor 313, control plane message monitor 313 further compares the GTP header sequence number received from the Delete Bearer Response message to the GTP header sequence number received from the Delete Bearer Request message previously received by control plane message monitor 313. Further, upon a determination that the GTP header sequence number received from the Delete Session Request message corresponds to the GTP header sequence number previously received from the Delete Session Request message, control plane identifier comparator 318 determines that the Delete Bearer Request message corresponds to the Delete Bearer Response message. Subsequently, control plane identifier comparator 318 determines that the dedicated bearer (represented by the EBI received from either the Delete Bearer Request/Response message) in association with the default bearer (represented by the LBI received from the Delete Bearer Request message) is disconnected, and therefore the monitoring probe 13 can delete the dedicated bearer's user plane SGW F-TEID, user plane SGSN F-TEID and EBI which were stored in association the IMSI/GUTI of user device 122a from the memory allocation of storage unit 132.

Persons skilled in the art will appreciate that the method depicted in FIG. 8 is advantageous in that it does not involve monitoring (or "sniffing") packets on the IuPS interface between SGSN 15a and RNC 123a, or on the Iub interface between each NodeB 121a and RNC 123a.

Figure 9:
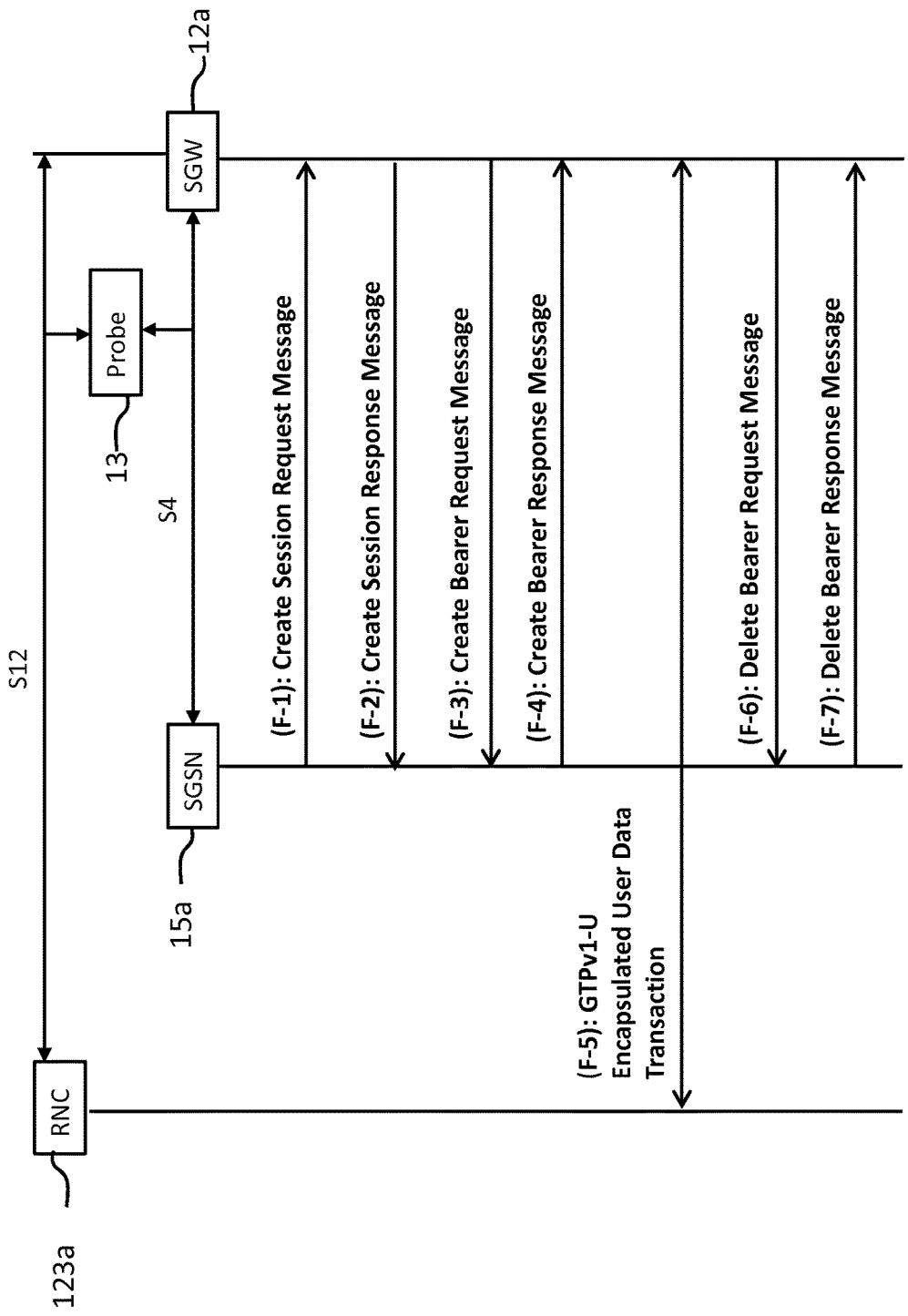
FIG. 9 is a flow diagram of yet another embodiment of a method of identifying a user plane identifier of a user device in a network by the monitoring probe of FIG. 1.

FIG. 9 is a flow diagram of yet another embodiment of a method of identifying a user plane identifier of a user device 122a in a network 10a by monitoring probe 13. The method comprises steps (F-1), (F-2), (F-3) and (F-4) which correspond to steps (E-1), (E-2), (E-3) and (E-4) in FIG. 8. Therefore, steps (F-1) to (F-4) may be performed as described above for steps (E-1) to (E-4). In this sixteenth embodiment of FIG. 9, Direct Tunneling is enabled and thus control plane message monitor 313 of monitoring probe 13 obtains a S12 RNC F-TEID (i.e., a user plane RNC F-TEID for the RNC 123) for the default bearer from the Create Session Request message at step (F-1), and also obtains a S12 RNC F-TEID for the dedicated bearer from the Create Bearer Request message at step (F-3).

In this sixteenth embodiment, at step (F-5), control plane message monitor 313 sniffs the GTPv1-U Encapsulated User Data Transaction(s) transmitted from RNC 123a to SGW 12a or vice versa on the S12 interface. The GTPv1-U Encapsulated User Data Transaction(s) may include one or more uplink user plane data transmissions and corresponding one or more downlink user plane data transmissions associated encapsulated in GTPv1-U tunnelling for the default bearer identified through steps (F-1) and (F-2), or for the dedicated bearer identified through steps (F-3) and (F-4).

The method in the sixteenth embodiment also comprises steps (F-6) and (F-7) which correspond to steps (E-6) and (E-7) respectively in FIG. 8.

Figure 10:
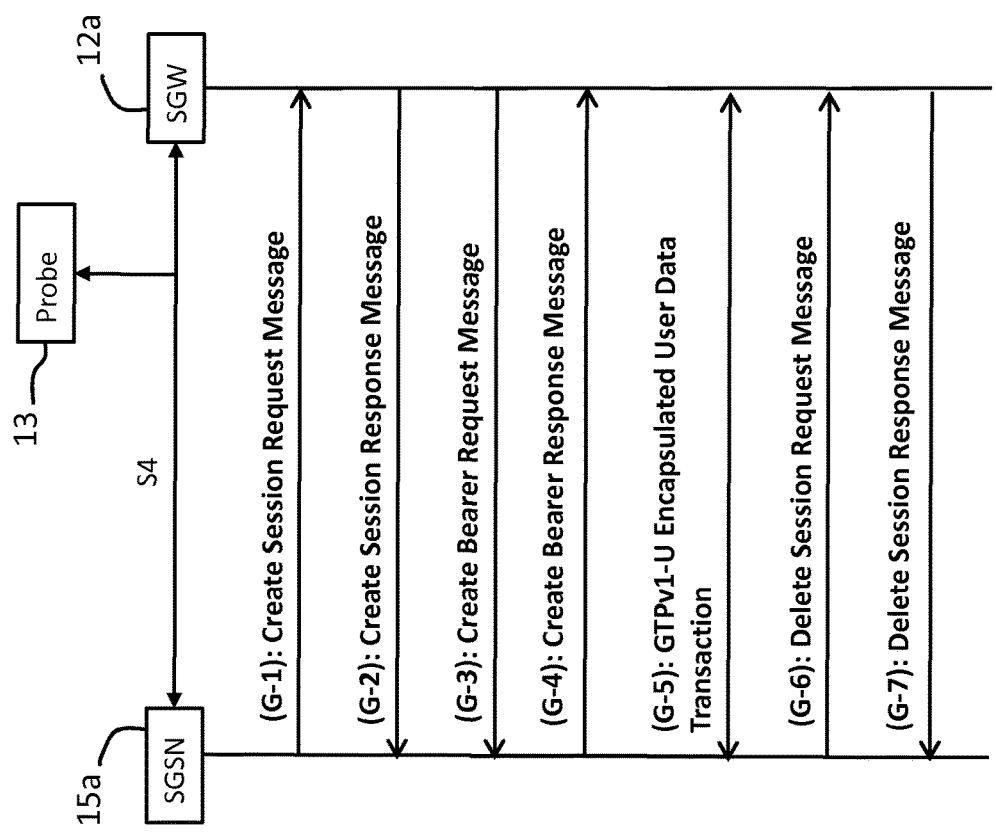
FIG. 10 is a flow diagram of yet another embodiment of a method of identifying a user plane identifier of a user device in a network by the monitoring probe of FIG. 1.

FIG. 10 is a flow diagram of yet another embodiment of a method of identifying a user plane identifier of a user device 122a in a network 10a by monitoring probe 13. The method comprises steps (G-1), (G-2), (G-3), (G-4) and (G-5) which correspond to steps (E-1), (E-2), (E-3), (E-4) and (E-5) in FIG. 8.

In the seventeenth embodiment of FIG. 10, instead of receiving the Delete Bearer Request message at step (E-6) and the corresponding Delete Bearer Response message at step (E-7), control plane message monitor 313 monitors SGW 12a for receipt of the Delete Session Request message at step (G-6) and further monitors SGSN 15a for receipt of the Delete Session Response message at step (G-7).

An step (G-6), control plane message monitor 313 monitors, via the above mentioned input network interface 134, for receipt of a Delete Session Request message transmitted from SGSN 15a to SGW 12a on the S4 interface. The Delete Session Request message received by control plane message monitor 313 comprises control plane identifiers in the form of a control plane SGW F-TEID and a control plane SGSN F-TEID and EBI. Specifically, control plane message monitor 313 obtains the EBI from the "Linked EPS Bearer ID" field from the Delete Session Request message, and the EBI represents a default bearer which will be disconnected. Then, control plane identifier comparator 318 compares the control plane SGW F-TEID received from the Delete Session Request message to the control plane SGW F-TEID received from the Create Session Response message previously received by control plane message monitor 313 and determines whether or not the two control plane identifiers correspond to each other.

Upon a determination by control plane identifier comparator 318 that the control plane SGW F-TEID received from the Delete Session Request message corresponds to the control plane SGW F-TEID received from the Create Session Response message previously received by control plane message monitor 313, control plane identifier comparator 318 further obtains, via control plane message monitor 313, the EBI and the GTP header sequence number from the Delete Session Request message. The EBI and the GTP header sequence number received from the Delete Session Request message can be later compared by control plane identifier comparator 318 to corresponding identifiers/parameters in a corresponding Delete Session Response message so as to confirm that the Delete Session Response message corresponds to the previously received Delete Session Request message.

At step (G-7), control plane message monitor 313 monitors SGSN 15a, via the above mentioned input network interface 134 for receipt of a corresponding Delete Session Response message transmitted from SGW 12a to SGSN 15a on the S4 interface, the Delete Session Response message comprising control plane identifiers in the form of a control plane SGSN F-TEID and a GTP header sequence number. Then, control plane identifier comparator 318 determines whether the Delete Session Response message corresponds to the Delete Session Request previously received at step (G-6) by comparing the control plane SGSN F-TEID received from the Delete Session Response message to the control plane SGSN F-TEID received from the Create Session Request message previously received by control plane message monitor 313 and also by comparing GTP header sequence numbers received from the Delete Session Request message received by control plane message monitor 313 at step (G-6) and the Delete Session Response message received by control plane message monitor 313 at step (G-7).

Upon determinations by control plane identifier comparator 318 that Delete Session Response message corresponds to the Delete Session Request previously received at step (G-6) by comparing the control plane SGSN F-TEID received from the Delete Session Response message to the control plane SGSN F-TEID received from the Create Session Request message previously received by control plane message monitor 313, and the GTP header sequence number of the Delete Session Request and Response messages correspond to each other, control plane identifier comparator 318 determines that the Delete Session Response message received at step (G-7) corresponds to the Delete Session Request previously received at step (G-6). As such, monitoring probe 13 deletes all associations of the control plane SGW F-TEID, the control plane SGSN F-TEID, the user plane SGW F-TEID, the user plane SGSN F-TEID, the EBI and the user device identifier IMSI/GUTI in the memory allocation for the default bearer in the memory allocation of storage unit 132. Further, in storage unit 132 monitoring probe 13 finds the memory allocation(s) recording user plane identifiers association of dedicated bearer(s), which depend upon the default bearer to be disconnected. Then, monitoring probe 13 deletes the memory allocations recording the user plane identifiers association of the dedicated bearer(s).

Figure 11:
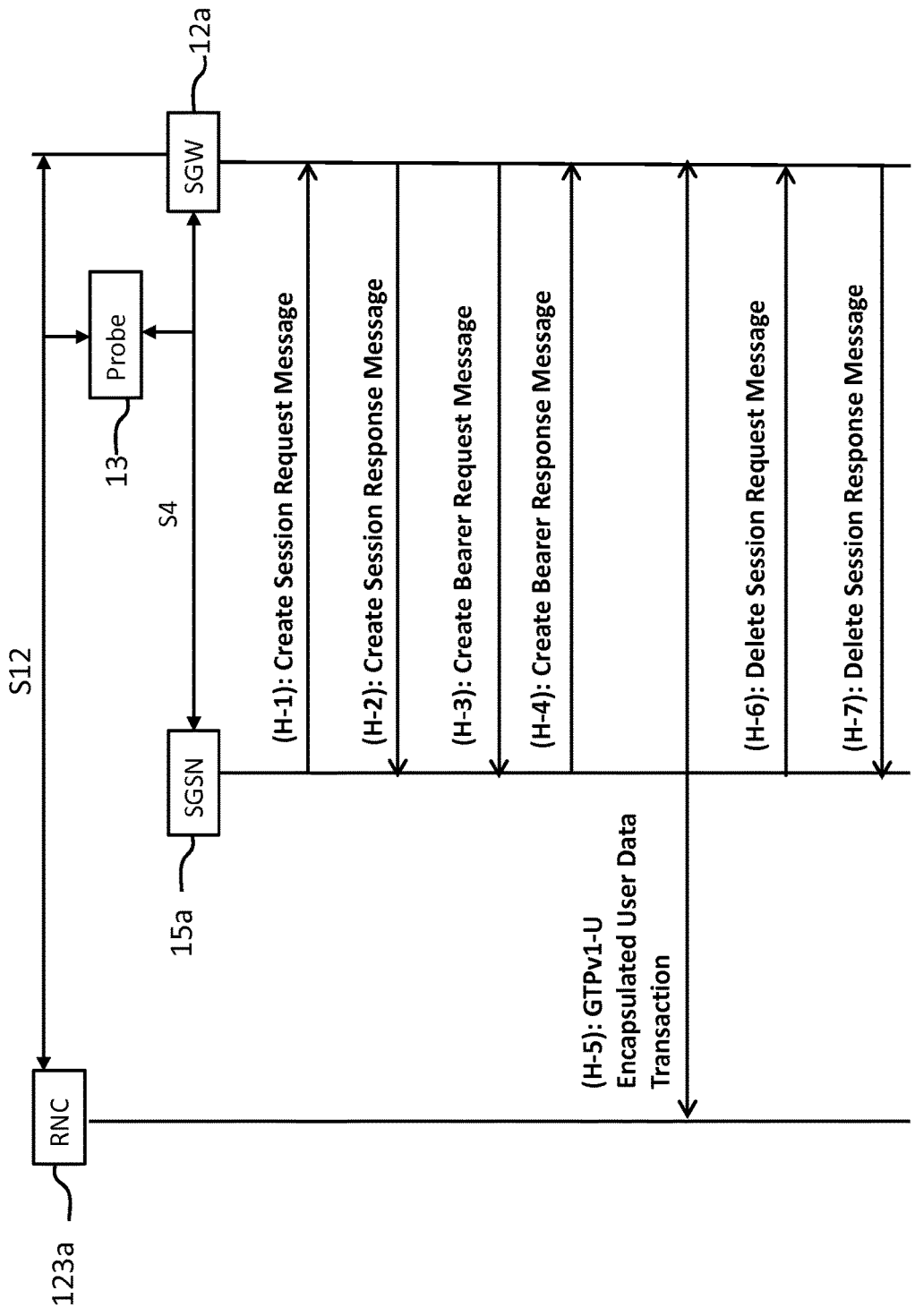
FIG. 11 is a flow diagram of yet another embodiment of a method of identifying a user plane identifier of a user device in a network by the monitoring probe of FIG. 1.

FIG. 11 is a flow diagram of yet another embodiment of a method of identifying a user plane identifier of user device 122*a* in a network 10*a* by monitoring probe 13. The method comprises steps (H-1), (H-2), (H-3) and (H-4) which correspond to steps (G-1), (G-2), (G-3) and (G-4) respectively in FIG. 10. Therefore, steps (H-1) to (H-4) may be performed as described above for steps (G-1) to (G-4). In this eighteenth embodiment of FIG. 11, Direct Tunneling is enabled, and thus control plane monitor 313 of monitoring probe 13 obtains a S12 RNC F-TEID (i.e., a user plane RNC F-TEID for the RNC 123) for the default bearer from the Create Session Request message at step (H-1), and also obtains a S12 RNC F-TEID for the dedicated bearer from the Create Bearer Request message at step (H-3).

In this eighteenth embodiment, at step (H-5), control plane message monitor 313 sniffs the GTPv1-U Encapsulated User Data Transaction(s) transmitted from RNC 123*a* to SGW 12*a* or vice versa on the S12 interface. The GTPv1-U Encapsulated User Data Transaction(s) may include one or more uplink user plane data transmissions and corresponding one or more downlink user plane data transmissions associated encapsulated in GTPv1-U tunnelling for the default bearer identified through the steps (H-1) and (H-2), or for the dedicated bearer identified through the steps (H-3) and (H-4).

The method in the eighteenth embodiment also comprises steps (H-6) and (H-7), which are similar to steps (G-6) and (G-7) respectively in FIG. 10. Therefore, steps (H-6) and (H-7) may be performed as described above for steps (G-6) and (G-7).

Persons skilled in the art will appreciate that the methods depicted in FIGS. 8 to 11 are advantageous in that they do not involve monitoring (or "sniffing") packets on the IuPS interface between SGSN 15*a* and RNC 123*a* or on the Iub interface between each NodeB 121*a* and RNC 123*a*.

Further aspects of monitoring probe 13 will be apparent to those skilled in the art in light of the foregoing description. Persons skilled in the art will also appreciate that any of the methods described above could be embodied in program code. The program code could be supplied in a number of ways, for example on a tangible computer readable medium, such as a disc or a memory, or as a data signal.

By executing the method for tracking user specific tunnels without querying any MMEs or any SGW in the LTE network, monitoring probe 13 remains able to distinguish the control plane messages in the user specific tunnels, and thus obtain required user plane identifiers/identity parameters from sniffing user specific tunnels traversed over the S4 interface. Further, monitoring probe 13 can obtain user plane identifiers for default bearer or both default bearer and the associated dedicated bearer(s) whose GTPv1 User Datagrams traverse S4/S12 interfaces.

The preceding embodiments of the present disclosure may be implemented in software/instruction codes/application logic/instruction set/computer program codes (executed by one or more processors), may be fully implemented in hardware, or implemented in a combination of software and hardware. For instance, the software (e.g., application logic, an instruction set) is maintained on any one of various conventional computer-readable media. In the present disclosure, a "computer-readable medium" may be any storage media or means that can carry, store, communicate, propagate or transport the instructions for use by or, in connection with, an instruction execution system, apparatus, or device, such as a computing device or a network monitoring probe 13 shown in FIG. 3. A "computer-readable medium" may include a computer-readable storage medium (e.g., a physical device) that may be any media or means that can carry or store the instructions for use by, or in connection with, a system, apparatus, or device, such as a computer or a communication device. For instance, storage unit 132 may include the computer-readable medium which may include computer program code which, when executed by processor unit 131, causes monitoring probe 13 to perform the procedures/steps illustrated in FIGS. 4-11.

Embodiments of the method of the present disclosure provide useful solutions to enable network monitoring probes to identify and track user specific tunnels in UTRAN/GERAN connected to a LTE network. The reference in this specification to any prior publication (or information derived from it), or to any matter which is known, is not, and should not be taken as an acknowledgement or admission or any form of suggestion that that prior publication (or information derived from it) or known matter forms part of the common general knowledge in the field of endeavour to which this specification relates.

It will be appreciated by those skilled in the art that numerous variations and/or modifications may be made to the invention without departing from the spirit or scope of the invention as broadly described. The present embodiments are therefore to be considered in all respects as illustrative and not restrictive.

The invention claimed is:

1. A method of identifying a user plane identifier of a user device by a monitoring probe in communication with at least one network device, the method comprising:

monitoring a Serving Gateway over an S4 interface of a multiple interfaces including the S4 interface, an S12 interface, an S11 interface, an S1-U interface, an S5 interface, wherein the S4 interface is connecting a Serving GPRS Support Node with the Serving Gateway, wherein the S12 interface is connecting the Serving Gateway with a Radio Network Controller, wherein the S11 interface is connecting a Mobility Management Entity with the Serving Gateway, wherein the S1-U interface is connecting a NodeB with the Serving Gateway, wherein the S5 interface is connecting the Serving Gateway with a Packet Gateway, wherein the Serving Gateway is monitored over the S4 interface for receipt of a Create Session Request message comprising a first control plane Serving GPRS Support Node fully qualified Tunnel end identifier and an International mobile subscriber identity or a Globally Unique Temporary Identifier, and a first user plane identifier, wherein the monitoring the Serving Gateway over the S4 interface enables identification of user specific tunnels without querying any Mobility Management Entity or any Serving Gateway in a telecommunication network;

in response to receipt of the Create Session Request message, monitoring the Serving Gateway over the S4 interface for receipt of a Create Session Response message comprising a second control plane Serving GPRS Support Node fully qualified Tunnel end identifier and a second user plane identifier;

in response to receipt of the Create Session Response message, comparing the first control plane Serving GPRS Support Node fully qualified Tunnel end identifier to the second control plane Serving GPRS Support Node fully qualified Tunnel end identifier in order to determine whether or not the first control plane Serving GPRS Support Node fully qualified Tunnel end identifier corresponds to the second control plane Serving GPRS Support Node fully qualified Tunnel end identifier;

in response to a determination that the first control plane Serving GPRS Support Node fully qualified Tunnel end identifier corresponds to the second control plane Serving GPRS Support Node fully qualified Tunnel end identifier, outputting the first control plane Serving GPRS Support Node fully qualified Tunnel end identifier, the first user plane identifier and the second user plane identifier to a same memory allocation such that the first user plane identifier and the second user plane identifier are identified as the user plane identifiers of a user device, wherein the first user plane identifier is user plane Serving GPRS Support Node fully qualified Tunnel end identifier and the second user plane identifier is a user plane Serving Gateway fully qualified Tunnel end identifier or a user plane Radio Network Controller fully qualified Tunnel end identifier;

monitoring the Serving Gateway for one or more user plane packets exchanged over the S4 interface or a S12 interface connecting the Serving Gateway with the Radio Network Controller which is further connected to at least one base station in a wireless communication network; and in response to a determination that the one or more user plane data packets from the S4 or the S12 interface include one of the user plane identifiers of the user device, identifying the one or more user plane data packets as belonging to a given session directly associated with one of the output user plane identifiers.

2. The method as claimed in claim 1, further comprising: obtaining the International mobile subscriber identity or the Globally Unique Temporary Identifier, a first control plane Serving Gateway fully qualified Tunnel end identifier and a first evolved packet system bearer identity associated with a default bearer for the user device from the Create Session Request message; and associating the first evolved packet system bearer identity, the first control plane Serving GPRS Support Node fully qualified Tunnel end identifier, the first control plane Serving Gateway fully qualified Tunnel end identifier and the first user plane identifier with the International mobile subscriber identity or the Globally Unique Temporary Identifier by outputting the first evolved packet system bearer identity, the first control plane Serving GPRS Support Node fully qualified Tunnel end identifier, the first control plane Serving Gateway fully qualified Tunnel end identifier, the first user plane identifier and the International mobile subscriber identity or the Globally Unique Temporary Identifier to the same memory allocation.

3. The method as claimed in claim 1, wherein each fully qualified Tunnel end identifier comprises a tunnel end identifier of a network device and an Internet Protocol address.

4. The method as claimed in claim 3, wherein each of the user plane identifiers of the user device is arranged to identify one or more user plane data packets transmitted from the Serving GPRS Support Node to the Serving Gateway, or vice versa.

5. The method as claimed in claim 3, wherein each of the user plane identifiers of the user device are arranged to identify one or more user plane data packets transmitted from the Radio Network Controller to the Serving Gateway, or vice versa.

6. The method as claimed in claim 3, wherein the step of determining that the first control plane Serving GPRS Support Node fully qualified Tunnel end identifier corresponds to the second control plane Serving GPRS Support Node fully qualified Tunnel end identifier further comprises:

in response to a determination that the first control plane message and the second control plane message are Create Session Request message and Create Session Response message respectively, determining whether a first GPRS Tunnelling Protocol header sequence number received from the Create Session Request message corresponds to a second GPRS Tunnelling Protocol header sequence number received from the Create Session Response message; and in response to the determination that the first GPRS Tunnelling Protocol header sequence number corresponds to the second GPRS Tunnelling Protocol header sequence number, outputting a determination that the first control plane Serving GPRS Support Node fully qualified Tunnel end identifier corresponds to the second control plane Serving GPRS Support Node fully qualified Tunnel end identifier.

7. The method as claimed in claim 6, further comprising:
monitoring the Serving Gateway over the S4 interface for receipt of a Modify Bearer Request message comprising a third control plane Serving GPRS Support Node fully qualified Tunnel end identifier and a third user plane identifier of the network device;

in response to receipt of the Modify Bearer Request message, comparing the third control plane Serving GPRS Support Node fully qualified Tunnel end identifier to the first control plane Serving GPRS Support Node fully qualified Tunnel end identifier in order to determine whether or not the third control plane Serving GPRS Support Node fully qualified Tunnel end identifier corresponds to the first control plane Serving GPRS Support Node fully qualified Tunnel end identifier; and in response to the determination that the third control plane Serving GPRS Support Node fully qualified Tunnel end identifier corresponds to the first control plane Serving GPRS Support Node fully qualified Tunnel end identifier, outputting the third user plane identifier of the network device as an updated user plane fully qualified Tunnel end identifier of the Serving GPRS Support Node or the Radio Network Controller.

8. The method as claimed in claim 7, further comprising:
in response to receipt of the Modify Bearer Request message, monitoring the Serving Gateway over the S4 interface for receipt of a Modify Bearer Response message comprising a fourth control plane Serving GPRS Support Node fully qualified Tunnel end identifier and a fourth user plane identifier of the Serving Gateway;
in response to receipt of the Modify Bearer Response message, comparing the fourth control plane Serving GPRS Support Node fully qualified Tunnel end identifier to the third control plane Serving GPRS Support Node fully qualified Tunnel end identifier in order to determine whether or not the fourth control plane Serving GPRS Support Node fully qualified Tunnel end identifier corresponds to the third control plane Serving GPRS Support Node fully qualified Tunnel end identifier;
in response to a determination that the fourth control plane Serving GPRS Support Node fully qualified Tunnel end identifier corresponds to the third control plane Serving GPRS Support Node fully qualified Tunnel end identifier, comparing a third GPRS Tunnelling Protocol sequence number received from the Modify Bearer Request message to a fourth GPRS Tunnelling Protocol sequence number received from the Modify Bearer Response message, in order to determine whether or not the third GPRS Tunnelling Protocol sequence number corresponds to the fourth GPRS Tunnelling Protocol sequence number; and
in response to a determination that the third GPRS Tunnelling Protocol sequence number corresponds to the fourth GPRS Tunnelling Protocol sequence number, determining the fourth control plane Serving GPRS Support Node fully qualified Tunnel end identifier corresponds to the third control plane Serving GPRS Support Node fully qualified Tunnel end identifier, and outputting the fourth user plane identifier of the Serving Gateway as an updated user plane Serving GPRS Support Node fully qualified Tunnel end identifier of the Serving Gateway.

9. The method as claimed in claim 8, further comprising:
monitoring the Serving Gateway over the S4 interface for receipt of a Delete Session Request Message comprising the second control plane Serving GPRS Support Node fully qualified Tunnel end identifier and a fifth GPRS Tunnelling Protocol header sequence number;
in response to receipt of the Delete Session Request Message, comparing the second control plane Serving GPRS Support Node fully qualified Tunnel end identifier to the first control plane Serving GPRS Support Node fully qualified Tunnel end identifier received from the Create Session Request message in order to determine whether or not the Delete Session Request Message corresponds to the Create Session Request message; and
in response to a determination that the Delete Session Request Message corresponds to the Create Session Request message, obtaining the fifth GPRS Tunnelling Protocol header sequence number from the Delete Session Request Message;
monitoring the Serving Gateway over the S4 interface for receipt of a Delete Session Response Message comprising a fifth control plane Serving GPRS Support Node fully qualified Tunnel end identifier and a sixth GPRS Tunnelling Protocol header sequence number; and
in response to receipt of the Delete Session Response Message, comparing the fifth control plane Serving GPRS Support Node fully qualified Tunnel end identifier to the first control plane Serving GPRS Support Node fully qualified Tunnel end identifier previously received from the Create Session Request message, in order to determine whether or not the fifth control plane Serving GPRS Support Node fully qualified Tunnel end identifier corresponds to the first control plane Serving GPRS Support Node fully qualified Tunnel end identifier.

10. The method as claimed in claim 9, further comprising:
in response to a determination that the fifth control plane Serving GPRS Support Node fully qualified Tunnel end identifier corresponds to the first control plane Serving GPRS Support Node fully qualified Tunnel end identifier, comparing the fifth GPRS Tunnelling Protocol header sequence number to the sixth GPRS Tunnelling Protocol header sequence number;
in response to a determination that the fifth GPRS Tunnelling Protocol header sequence number corresponds to the sixth GPRS Tunnelling Protocol header sequence number, determining the Delete Session Response message corresponds to the Delete Session Request message; and
in response to a determination that the Delete Session Response message corresponds to the Delete Session Request message, deleting from the memory allocation the first evolved packet system bearer identity, the first control plane Serving GPRS Support Node fully qualified Tunnel end identifier, the first control plane Serving Gateway fully qualified Tunnel end identifier and the updated user plane Serving Gateway fully qualified Tunnel end identifier or the updated user plane Serving GPRS Support Node fully qualified Tunnel end identifier.

11. A monitoring probe for identifying a user plane identifier of a user device, the monitoring probe comprising:
a control plane message monitor, which:
monitors a Serving Gateway over an S4 interface of a multiple interfaces including the S4 interface, an S12 interface, an S11 interface, an S1-U interface, an S5 interface, wherein the S4 interface is connecting a Serving GPRS Support Node with the Serving Gateway, wherein the S12 interface is connecting the Serving Gateway with a Radio Network Controller, wherein the S11 interface is connecting a Mobility Management Entity with the Serving Gateway, wherein the S1-U interface is connecting a NodeB with the Serving Gateway, wherein the S5 interface is connecting the Serving Gateway with a Packet Gateway, wherein the Serving Gateway is monitored over the S4 interface for receipt of a Create Session Request message comprising a first control plane Serving GPRS Support Node fully qualified Tunnel end identifier and an International mobile subscriber identity or Globally Unique Temporary Identifier, and a first user plane identifier, wherein the monitoring the Serving Gateway over the S4 interface enables identification of user specific tunnels without querying any Mobility Management Entity or any Serving Gateway in a telecommunication network; and
monitors the Serving Gateway over the S4 interface for receipt of a Create Session Response message comprising a second control plane Serving GPRS Support Node fully qualified Tunnel end identifier and a second user plane identifier, in response to receipt of the Create Session Request message;
a control plane identifier comparator, which compares the first control plane Serving GPRS Support Node fully qualified Tunnel end identifier to the second control plane Serving GPRS Support Node fully qualified Tunnel end identifier in order to determine whether or not the first control plane Serving GPRS Support Node fully qualified Tunnel end identifier corresponds to the second control plane Serving GPRS Support Node fully qualified Tunnel end identifier, in response to receipt of the Create Session Response message; and
a user plane identifier output, which outputs the first control plane Serving GPRS Support Node fully qualified Tunnel end identifier, the first user plane identifier and the second user plane identifier to a same memory allocation of a memory device such that the first user plane identifier and the second user plane identifier are identified as the user plane identifiers of a user device, wherein the first user plane identifier is user plane Serving GPRS Support Node fully qualified Tunnel end identifier and the second user plane identifier is a user plane Serving Gateway fully qualified Tunnel end identifier or a user plane Radio Network Controller fully qualified Tunnel end identifier, in response to a determination that the first control plane Serving GPRS Support Node fully qualified Tunnel end identifier corresponds to the second control plane Serving GPRS Support Node fully qualified Tunnel end identifier.

12. The monitoring probe as claimed in claim 11, wherein:
the control plane message monitor further monitors the Serving Gateway for one or more user plane data packets exchanged over the S4 interface or a S12 interface connecting the Serving Gateway with the Radio Network Controller which is further connected with at least one base station in a wireless communication network; and
the control plane identifier comparator identifies the one or more user plane data packets as belonging to a given session directly associated with one of the output user plane identifiers in response to a determination that the one or more user plane data packets from the S4 or the S12 interface include one of the user plane identifiers of the user device.

13. The monitoring probe as claimed in claim 12, wherein:
the control plane message monitor further obtains the International mobile subscriber identity or the Globally Unique Temporary Identifier, a first control plane Serving Gateway fully qualified Tunnel end identifier and a first evolved packet system bearer identity associated with a default bearer for the user device from the Create Session Request message; and
the user plane identifier output outputs the International mobile subscriber identity or the Globally Unique Temporary identifier, the first evolved packet system bearer identity, the first control plane Serving GPRS Support Node fully qualified Tunnel end identifier, the first control plane Serving Gateway fully qualified Tunnel end identifier and the first user plane identifier in the memory allocation of the memory device.

14. The monitoring probe as claimed in claim 13, wherein each fully qualified Tunnel end identifier comprises a fully qualified Tunnel end identifier of a network device and an Internet Protocol address.

15. The monitoring probe as claimed in claim 14, wherein:
the control plane message monitor further monitors the Serving Gateway over the S4 interface for receipt of a Modify Bearer Request message comprising a third control plane Serving GPRS Support Node fully qualified Tunnel end identifier and a third user plane identifier of the network device;
the control plane identifier comparator compares the third control plane Serving GPRS Support Node fully qualified Tunnel end identifier to the first control plane Serving GPRS Support Node fully qualified Tunnel end identifier in order to determine whether or not the third control plane Serving GPRS Support Node fully qualified Tunnel end identifier corresponds to the first control plane Serving GPRS Support Node fully qualified Tunnel end identifier, in response to receipt of the Modify Bearer Request message by the control plane message monitor; and
the user plane identifier output outputs the third user plane identifier of the network device as an updated user plane fully qualified Tunnel end identifier of the Serving GPRS Support Node or the Radio Network Controller, in response to the determination that the third control plane Serving GPRS Support Node fully qualified Tunnel end identifier corresponds to the first control plane Serving GPRS Support Node fully qualified Tunnel end identifier.

16. The monitoring probe as claimed in claim 15, wherein:
the control plane message monitor monitors the Serving Gateway over the S4 interface for receipt of a Modify Bearer Response message comprising a fourth control plane Serving GPRS Support Node fully qualified Tunnel end identifier and a fourth user plane identifier of the Serving Gateway, in response to receipt of the Modify Bearer Request message;
the control plane identifier comparator compares the fourth control plane Serving GPRS Support Node fully qualified Tunnel end identifier to the third control plane Serving GPRS Support Node fully qualified Tunnel end identifier in order to determine whether or not the fourth control plane Serving GPRS Support Node fully qualified Tunnel end identifier corresponds to the third control plane Serving GPRS Support Node fully qualified Tunnel end identifier, in response to receipt of the Modify Bearer Response message by the control plane message monitor;
the control plane identifier comparator compares a third GPRS Tunnelling Protocol sequence number received from the Modify Bearer Request message to a fourth GPRS Tunnelling Protocol sequence number received from the Modify Bearer Response message, in order to determine whether or not the third GPRS Tunnelling Protocol sequence number corresponds to the fourth GPRS Tunnelling Protocol sequence number, in response to a determination that the fourth control plane Serving GPRS Support Node fully qualified Tunnel end identifier corresponds to the third control plane Serving GPRS Support Node fully qualified Tunnel end identifier;
the control plane identifier comparator determines the fourth control plane Serving GPRS Support Node fully qualified Tunnel end identifier corresponds to the third control plane Serving GPRS Support Node fully qualified Tunnel end identifier, in response to a determination that the third GPRS Tunnelling Protocol sequence number corresponds to the fourth GPRS Tunnelling Protocol sequence number; and the user plane identifier output outputs the fourth user plane identifier of the Serving Gateway as an updated user plane Serving Gateway fully qualified Tunnel end identifier for the Serving Gateway.

17. The monitoring probe as claimed in claim 16, wherein:

the control plane message monitor monitors the Serving Gateway over the S4 interface for receipt of a Delete Session Request Message comprising a second control plane Serving Gateway fully qualified Tunnel end identifier and a fifth GPRS Tunnelling Protocol header sequence number;

the control plane identifier comparator compares the second control plane Serving Gateway fully qualified Tunnel end identifier to the first control plane Serving Gateway fully qualified Tunnel end identifier received from the Create Session Request message in order to determine whether or not the Delete Session Request Message corresponds to the Create Session Request message, in response to receipt of the Delete Session Request Message by the control plane message monitor;

the control plane message monitor obtains the fifth GPRS Tunnelling Protocol header sequence number from the Delete Session Request Message, in response to a determination that the Delete Session Request Message corresponds to the Create Session Request message;

the control plane message monitor monitors the Serving GPRS Support Node over the S4 interface for receipt of a Delete Session Response Message comprising a fifth control plane Serving GPRS Support Node fully qualified Tunnel end identifier and a sixth GPRS Tunnelling Protocol header sequence number; and the control plane identifier comparator compares the fifth control plane Serving GPRS Support Node fully qualified Tunnel end identifier to the first control plane Serving GPRS Support Node fully qualified Tunnel end identifier previously received from the Create Session Request message, in order to determine whether or not the fifth control plane Serving GPRS Support Node fully qualified Tunnel end identifier corresponds to the first control plane Serving GPRS Support Node fully qualified Tunnel end identifier, in response to receipt of the Delete Session Response Message.

18. The monitoring probe as claimed in claim 17, wherein:

the control plane identifier comparator compares the fifth GPRS Tunnelling Protocol header sequence number to the sixth GPRS Tunnelling Protocol header sequence number, in response to a determination that the fifth control plane Serving GPRS Support Node fully qualified Tunnel end identifier corresponds to the first control plane Serving GPRS Support Node fully qualified Tunnel end identifier;

the control plane identifier comparator determining the Delete Session Response message corresponds to the Delete Session Request message, in response to a determination that the fifth GPRS Tunnelling Protocol header sequence number corresponds to the sixth GPRS Tunnelling Protocol header sequence number; and the monitoring probe deletes from the memory allocation the first evolved packet system bearer identity, the first control plane Serving GPRS Support Node fully qualified Tunnel end identifier, the first control plane Serving Gateway fully qualified Tunnel end identifier and the updated user plane Serving Gateway fully qualified Tunnel end identifier or the updated user plane Serving GPRS Support Node fully qualified Tunnel end identifier, in response to a determination that the Delete Session Response message corresponds to the Delete Session Request message.

\* \* \* \* \*